US012574230B2

(12) United States Patent
Kärkkäinen

(10) Patent No.: US 12,574,230 B2
(45) Date of Patent: Mar. 10, 2026

(54) METHODS AND ARRANGEMENTS FOR ESTABLISHING DIGITAL IDENTITY

(71) Applicant: Gurulogic Microsystems Oy, Turku (FI)

(72) Inventor: Tuomas Kärkkäinen, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

(21) Appl. No.: 18/838,330

(22) PCT Filed: Feb. 13, 2023

(86) PCT No.: PCT/FI2023/050088
§ 371 (c)(1),
(2) Date: Aug. 14, 2024

(87) PCT Pub. No.: WO2023/156709
PCT Pub. Date: Aug. 24, 2023

(65) Prior Publication Data
US 2025/0141673 A1 May 1, 2025

(30) Foreign Application Priority Data
Feb. 16, 2022 (EP) .................................... 22157019

(51) Int. Cl.
*H04L 9/08* (2006.01)
*G06F 7/58* (2006.01)
*H04L 9/32* (2006.01)
(52) U.S. Cl.
CPC .............. *H04L 9/0869* (2013.01); *G06F 7/58* (2013.01)

(58) Field of Classification Search
CPC ................................. H04L 9/0869; G06F 7/58
(Continued)

(56) References Cited

U.S. PATENT DOCUMENTS 10,396,985 B1 * 8/2019 Nagelberg ............ H04L 9/3247
10,454,677 B1 * 10/2019 Nagelberg ......... G06V 40/1365
(Continued)

FOREIGN PATENT DOCUMENTS

JP      2006148879 A    6/2006
JP      2012080152 A    4/2012

OTHER PUBLICATIONS

Andrej J. Zwitter1; Digital Identity and the Blockchain: Universal Identity Management and the Concept of the "Self-Sovereign" Individual; IABD: 2020; pp. 1-14.*
(Continued)

*Primary Examiner* — Monjur Rahim
(74) *Attorney, Agent, or Firm* — Ziegler IP Law Group, LLC.

(57) ABSTRACT

An arrangement has a random data generator for producing a crypto seed, and may use a secure transport mechanism. The arrangement may produce, through a first cryptographic operation, a cryptographic intermediate product that is deterministically dependent on both the crypto seed and a user's secret received through the secure transport mechanism. This cryptographic intermediate product constitutes a digital identity of the party. A second cryptographic operation uses the digital identity of the party to produce a cryptographic output including the crypto seed in encrypted form. The arrangement transmits at least part of the cryptographic output through the secure transport mechanism.

14 Claims, 10 Drawing Sheets

(58) Field of Classification Search
USPC ......................................................... 713/171
See application file for complete search history.

(56) References Cited

U.S. PATENT DOCUMENTS

| | | | | |
|---|---|---|---|---|
| 10,615,970 | B1 * | 4/2020 | Griffin .................. | H04L 9/0822 |
| 11,599,603 | B1 * | 3/2023 | Pala ..................... | H04L 63/0823 |
| 11,606,198 | B2 * | 3/2023 | Wilson .................. | H04L 9/0847 |
| 2001/0033662 | A1 * | 10/2001 | Nishikawa ........... | H04L 9/0662 |
| | | | | 705/58 |
| 2003/0065925 | A1 * | 4/2003 | Shindo ............... | H04N 21/4334 |
| | | | | 713/193 |
| 2008/0301461 | A1 * | 12/2008 | Coulier .................. | G06F 21/34 |
| | | | | 713/184 |
| 2010/0002877 | A1 * | 1/2010 | Zhang .................. | H04L 9/0662 |
| | | | | 380/46 |
| 2011/0150212 | A1 | 6/2011 | Spalka et al. | |
| 2011/0258452 | A1 * | 10/2011 | Coulier ................. | H04L 9/3242 |
| | | | | 713/171 |
| 2013/0042111 | A1 * | 2/2013 | Fiske ...................... | G06F 21/32 |
| | | | | 713/170 |
| 2013/0311784 | A1 * | 11/2013 | Bleahen ................ | H04L 9/3231 |
| | | | | 713/185 |
| 2014/0189359 | A1 * | 7/2014 | Marien ................. | H04L 9/3228 |
| | | | | 713/172 |
| 2014/0331279 | A1 * | 11/2014 | Aissi ....................... | G06F 21/57 |
| | | | | 726/1 |
| 2017/0034167 | A1 * | 2/2017 | Figueira ............... | H04L 63/061 |
| 2017/0104580 | A1 * | 4/2017 | Wooten ................... | H04L 9/002 |
| 2018/0119975 | A1 * | 5/2018 | Park ...................... | G06F 21/602 |
| 2018/0232526 | A1 * | 8/2018 | Reid .................. | G06F 21/6218 |
| 2018/0288031 | A1 | 10/2018 | Kumar | |
| 2019/0028281 | A1 * | 1/2019 | Turissini ................ | G06F 21/57 |
| 2019/0042708 | A1 * | 2/2019 | Pala ....................... | G06F 21/105 |
| 2020/0084222 | A1 * | 3/2020 | William ................. | H04L 63/12 |
| 2020/0092097 | A1 * | 3/2020 | Chiu .................. | G06Q 20/3678 |
| 2020/0313886 | A1 * | 10/2020 | Poeppelmann ....... | H04L 9/3236 |
| 2021/0029096 | A1 * | 1/2021 | Hart ...................... | H04L 9/0869 |
| 2021/0152532 | A1 * | 5/2021 | Reinhold .............. | H04L 9/0643 |
| 2021/0327008 | A1 * | 10/2021 | Salah ........................ | G06F 8/38 |
| 2021/0385069 | A1 * | 12/2021 | Reid ....................... | G06F 21/32 |
| 2022/0345300 | A1 * | 10/2022 | Inamdar .............. | H04L 63/0869 |

OTHER PUBLICATIONS

European Patent Office, Communication Pursuant to Article 94(3)EPC, Application No. 22157019.5-1218, Issue Date Nov. 3, 2023, 7 Pages.

European Patent Office, Extended European Search Report, Application No. EP22157019, Issue Date Aug. 8, 2022, 8 Pages.

Finnish Patent and Registration Office, International Preliminary Report on Patentability, International Application No. PCT/FI2023/050088, Date of Completion May 17, 2024, 25 Pages.

Finnish Patent and Registration Office, International Search Report, International Application No. PCT/FI2023/050088, Mailed Jun. 1, 2023, 5 Pages.

Finnish Patent and Registration Office, Written Opinion of the International Searching Authority, International Application No. PCT/FI2023/050088, Mailing Date Jun. 1, 2023, 11 Pages.

Finnish Patent and Regristartion Office, Written Opinion of the International Preliminary Examining Authority, International Application No. PCT/FI2023/050088, Mailing Date Mar. 4, 2024, 10 Pages.

Japan Patent Office, Notice of Allowance, Application No. 2024-546250, mailed Dec. 24, 2025, 3 pages.

* cited by examiner

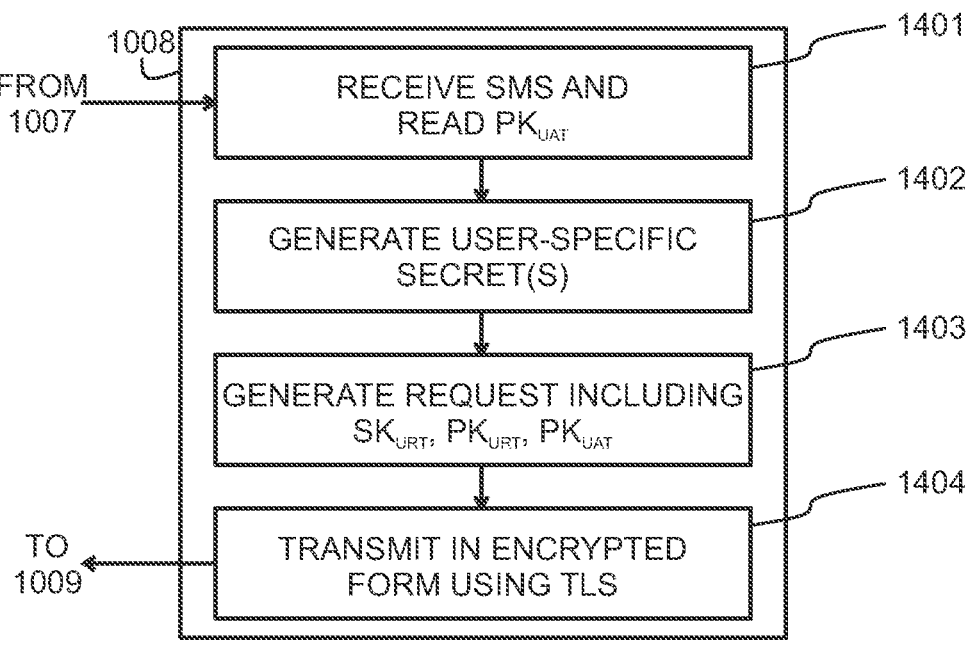

FROM
1007

1008

RECEIVE SMS AND
READ PK$_{UAT}$    1401

GENERATE USER-SPECIFIC
SECRET(S)    1402

GENERATE REQUEST INCLUDING
SK$_{URT}$, PK$_{URT}$, PK$_{UAT}$    1403

TO
1009

TRANSMIT IN ENCRYPTED
FORM USING TLS    1404

Fig. 14

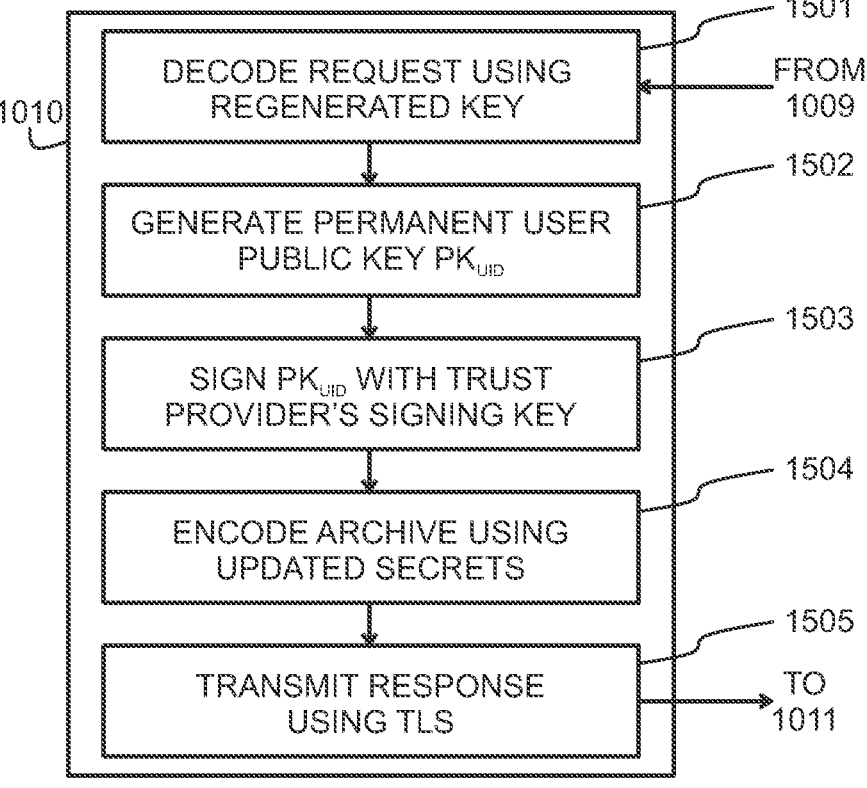

1010

DECODE REQUEST USING
REGENERATED KEY    1501    FROM 1009

GENERATE PERMANENT USER
PUBLIC KEY PK$_{UID}$    1502

SIGN PK$_{UID}$ WITH TRUST
PROVIDER'S SIGNING KEY    1503

ENCODE ARCHIVE USING
UPDATED SECRETS    1504

TRANSMIT RESPONSE
USING TLS    1505    TO 1011

Fig. 15

METHODS AND ARRANGEMENTS FOR ESTABLISHING DIGITAL IDENTITY

FIELD OF THE INVENTION

The invention concerns generally the technical field of security needed in using digital services. In particular, the invention concerns the task of centrally establishing trust among parties that may thereafter rely upon the centrally established trust in decentralized use of digital services.

BACKGROUND OF THE INVENTION

Security in digital communications involves multiple aspects such as confidentiality (only authorized parties can access a piece of information), authentication (a communicating party must be sure who they are communicating with), integrity (a piece of information has not been unallowably modified), and nonrepudiation (a party cannot successfully deny having sent a certain piece of information). For authentication, it is common to rely upon a third party called a trust provider. A user of a computer or smartphone wishing to communicate with the website of a service provider must first make contact with the authentication service of the trust provider, typically using a user ID and a disposable key that is either read from a printed list in the possession of the user or provided by a purpose-built app running in the user device. Once the authentication service has verified the identity of the user, the user is redirected to the originally pursued website together with a digital certificate issued by the trust provider.

On a conceptual level, digital authentication may be compared to the well-known conventional practice of physically presenting an ID card, passport, driver's license or other official document that the user has previously obtained from an authority. It has been widely agreed that if the nature of such an official document makes it reliable enough, the user may re-use it freely at occasions of their choice, at least for a certain period of time after its date of issuance.

A drawback of the known arrangements in the digital world is the continuous dependency of the communicating parties on the trust provider. The same authentication routine must be repeated every time when the user wants to contact the service provider, causing additional costs that will eventually end up being paid by the user.

Another problem of the known arrangements is that they bind users to their client relationship with e.g. a bank, a teleoperator, or some other intermediate party who may not have any close association to the communications that the user wishes to conduct with a service provider. In order to provide better independency for users, and also in order to exclude such intermediate parties from acting as gatekeepers with at least a theoretical possibility of monitoring when, where, and with whom users conduct secure digital communications, it would be better if the provision of a digital identity and related services would be centralised under governmental or other trusted authorities.

The known arrangements involve also a further drawback, which actually dates back to the times of using printed proof of identity such as printed passports, driving licenses, or ID cards: typically, the user must share too much information with the service provider. As a trivial example, when the user buys alcoholic drinks and is asked for papers, the sales assistant is actually entitled to only know, whether the user is above or below the statutory age limit. Instead, by showing their driving license the user will reveal their exact age, their social security number, the vehicle classes they are allowed to drive, and so on. Similar happenings occur also with digital certificates, because typically the trust provider does not know, at the time when the authentication request comes from the user, what the digital certificate will be used for later when the user communicates with the service provider. Consequently, the digital certificate may easily contain unnecessarily much information of the user.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide methods and arrangements for establishing, utilizing, and enabling the utilisation of a digital identity for a party without the disadvantages of prior art outlined above. A particular objective is to ensure that users, service providers, and other parties wishing to engage in secure digital communications and transactions may do so without a continuous dependency on third parties for providing trust, namely via direct trust relationship. An additional objective is to ensure that parties would need to only exchange necessary information for the purposes of secure digital communications. A yet further, particularly important objective is to ensure confidentiality and data protection in everything that relates to the establishing and use of a digital identity.

According to a first aspect, there is provided an arrangement for establishing a digital identity for a party. The arrangement comprises a random data generator configured to produce a crypto seed, as well as a receiving end and a transmitting end of a secure transport mechanism. A first cryptographic operation is coupled to said random data generator and said receiving end of the secure transport mechanism, and a second cryptographic operation is coupled to said first cryptographic operation and said transmitting end of the secure transport mechanism. Said arrangement is configured to produce, through said first cryptographic operation, a cryptographic intermediate product that is deterministically dependent on both said crypto seed and a user's secret received through said secure transport mechanism, which cryptographic intermediate product constitutes said digital identity of said party. Said arrangement is configured to produce, through said second cryptographic operation and using said digital identity of said party, a cryptographic output including said crypto seed in encrypted form. Said arrangement is configured to transmit at least part of said cryptographic output through said secure transport mechanism.

According to an embodiment, the arrangement is configured to permanently obfuscate said digital identity from memory after using it in said production of said cryptographic output. This involves at least the advantage that there is no risk of said digital identity becoming accidentally revealed later, at least not through any action related to the arrangement.

According to an embodiment, the arrangement is configured to produce, through said second cryptographic operation, a cryptographic certificate of said party as a part of said cryptographic output. This involves at least the advantage that said party can later use said cryptographic certificate for authentication without having to make further contact with the arrangement.

According to an embodiment, the arrangement comprises a pre-provisioning functionality configured to respond to a received pre-provisioning request, indicative of an identifier and at least one attribute of said party, by establishing a provisional secret for said party and transmitting out a pre-provisioning response containing at least a part of said provisional secret. The arrangement may further comprise a registration finalizing functionality configured to respond to a registration finalizing request, received after said transmitting of the pre-provisioning response, by verifying contents of said registration finalizing request against said provisional secret. Said pre-provisioning functionality may be configured to use said crypto seed to encrypt and store said identifier and said at least one attribute into a provisional encrypted archive specific to said party. Said registration finalizing functionality may be configured to use said user's secret received in said registration finalizing request to encrypt and store said identifier and said at least one attribute into a finalized encrypted archive specific to said party. The arrangement may further be configured to use said digital identity in said encrypting and storing of said identifier and said at least one attribute into said finalized encrypted archive. This involves at least the advantage that certain preparatory actions may be taken, and certain provisional cryptoproducts be produced, for a party who has not yet provided the user's secret that is needed for finalizing the registration of the user.

According to an embodiment, said pre-provisioning functionality is configured to generate a pair of ephemeral keys of an asymmetric encryption system as said provisional secret for said party, and transmit a public key of said pair of ephemeral keys in said pre-provisioning response. This involves at least the advantage that additional security can be provided for the steps needed to later establish the digital identity of said party.

According to an embodiment, said pre-provisioning functionality is configured to use a random number provided by said random data generator as the secret key of said pair of ephemeral keys, and generate the public key of said pair of ephemeral keys from said secret key of said pair of ephemeral keys using the Curve25519 Elliptic Curve Diffie-Hellman method. This involves at least the advantage that the created pair of keys may have certain mathematical relation with a corresponding pair of keys generated by the party, for which the digital identity is to be established, which simplifies certain further steps in the process.

According to an embodiment, said pre-provisioning functionality is configured to generate a first shared secret through a first mathematical operation using said secret key of said pair of ephemeral keys and a public key received from an entity external to said arrangement, and use said first shared secret in said encrypting and storing of said identifier and said at least one attribute into said provisional encrypted archive. This involves further advantages related to the mathematical relations between keys mentioned above.

According to an embodiment, the arrangement is configured to use an Argon2 hash operation as said first cryptographic operation. This involves at least the advantage that the cryptographic intermediate product can be produced with a method that is well known, widely applicable, and trusted for its sufficient level of security.

According to an embodiment, the arrangement is configured to use said digital identity to generate parts of the cryptographic output for said party. The arrangement may also be configured to generate a certificate of said party by signing at least part of the cryptographic output with a signing key of the arrangement. This involves at least the advantage that the certificate can be produced with a method that is well known, widely applicable, and trusted for its sufficient level of security.

According to an embodiment, the arrangement is configured to generate, as one of said parts of the cryptographic output, a public key of a further pair of keys of an asymmetric encryption system from said digital identity, using the Curve25519 Elliptic Curve Diffie-Hellman method. This involves at least the advantage that the party, for which the digital identity is established, can later utilise such a pair of keys for various cryptographic purposes.

According to an embodiment, the arrangement is configured to transmit said cryptographic output in a registration finalizing response after said generating of said digital identity. This involves at least the advantage that the party, for which the digital identity was established, may receive sufficient pieces of digital information for later utilising the trust established by the arrangement, even without having to again contact the arrangement.

According to an embodiment, the arrangement is configured to transmit, in said registration finalizing response, said crypto seed in encrypted form as well as a signed form of an encryption key for use by an entity external to said arrangement, wherein said encryption key is one half of a key pair of an asymmetric encryption system constituting or derived from said digital identity of said party. This involves at least the advantage that the party, for which the digital identity was established, may receive sufficient pieces of digital information for later utilising the trust established by the arrangement, even without having to again contact the arrangement.

According to a second aspect, there is provided a method for establishing a digital identity for a party. The method comprises producing a crypto seed as a piece of random data, and receiving a user's secret from an external source through a secure transport mechanism. The method comprises applying a first cryptographic operation to produce a cryptographic intermediate product that is deterministically dependent on both said crypto seed and said user's secret, which cryptographic intermediate product constitutes said digital identity of said party. The method comprises applying a second cryptographic operation to said digital identity of said party to produce a cryptographic output including said crypto seed in encrypted form. The method comprises transmitting at least part of said cryptographic output through said secure transport mechanism to said external source.

According to an embodiment, the method comprises permanently obfuscating said digital identity from memory after using it in said production of said cryptographic output. This involves at least the advantage that there is no risk of said digital identity becoming accidentally revealed later, at least not through any action related to the arrangement executing the method.

According to an embodiment, the method comprises producing, through said second cryptographic operation, a cryptographic certificate of said party as a part of said cryptographic output. This involves at least the advantage that said party can later use said cryptographic certificate for authentication without having to make further contact with the arrangement executing the method.

According to an embodiment, the method comprises responding to a received pre-provisioning request, indicative of an identifier and at least one attribute of said party, by establishing a provisional secret for said party and transmitting out a pre-provisioning response containing at least a part (PKUAT) of said provisional secret. The method may then comprise using, as a part of said establishing of the provisional secret, said crypto seed to encrypt and store said identifier and said at least one attribute into a provisional encrypted archive specific to said party. The method may further comprise responding to a registration finalizing request, received after said transmitting of the pre-provisioning response, by verifying contents of said registration finalizing request against said provisional secret. The method may additionally comprise using said user's secret received in said registration finalizing request to encrypt and store said identifier and said at least one attribute into a finalized encrypted archive specific to said party, and using said digital identity in said encrypting and storing of said identifier and said at least one attribute into said finalized encrypted archive. This involves at least the advantage that certain preparatory actions may be taken, and certain provisional cryptoproducts be produced, for a party who has not yet provided the user's secret that is needed for finalizing the registration of the user.

BRIEF DESCRIPTION OF THE DRAWINGS

In the drawings:

FIG. 14 illustrates one possible more detailed example of an action shown in FIG. 10, FIG. 15 illustrates one possible more detailed example of an action shown in FIG. 10.

DETAILED DESCRIPTION

Figures 1, 2:
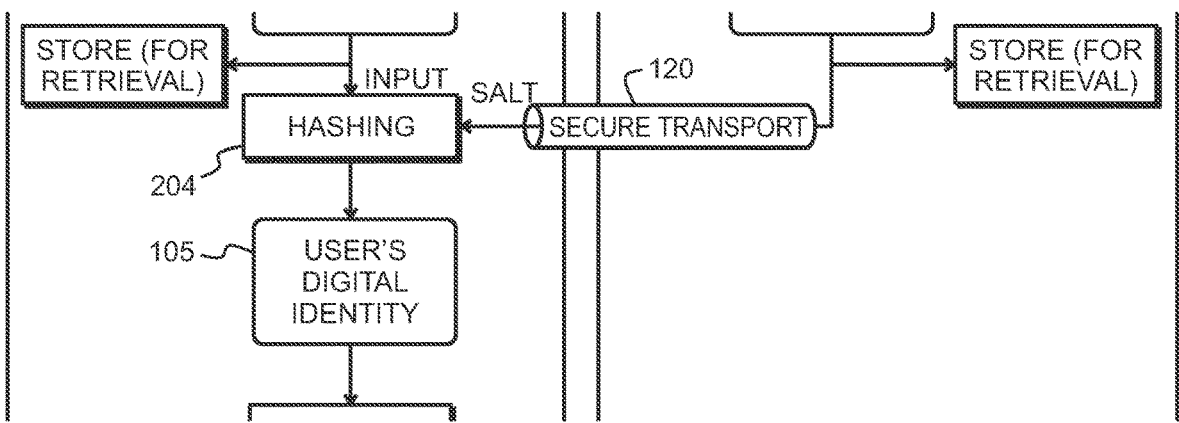
FIG. 1 illustrates actions taken by a user device and a trust provider in an example embodiment.
FIG. 2 illustrates some actions taken in another example embodiment.

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

The concept of digital identity is central to the following description. The digital identity may alternatively be called cryptoidentity. As a concept, the digital identity or cryptoidentity may be characterised as a piece of digital information that is unique enough to reliably identify a party. For example, if a mathematical algorithm is used to produce a cryptoproduct such as an encryption key, set of keys, certificate, digital signature, or the like using the digital identity or cryptoidentity as a seed, it must be highly unlikely—up to the limit of practically impossible—that the same cryptoproduct could be obtained without knowing that particular digital identity. A party capable of presenting such a cryptoproduct can securely be assumed to be the party identified by the respective digital identity, taken that appropriate care has been taken in generating and handling the digital identity.

The authenticity of the digital identity or cryptoidentity, and consequently the reliability of the cryptoproduct produced therefrom, may be greatly enhanced by having a trusted party play a role in its generation. The trusted party may be a party comparable to the known trust providers. For this reason, the term trust provider is also used in this description. As alternatives, the terms vault and/or wallet provider may be used. Also the acronyms CA and/or VA (Certification Authority, Validation Authority) may be used.

The nature of a digital identity or cryptoidentity may be figuratively illustrated with a comparison to the conventional world of paper documents. At the time of writing this description, a passport is required to contain digitally encoded information derived from biometric data of the user, such as a face image and/or fingerprints. The face and friction ridges of the user are representations of the user's identity, while the passport is a "cryptoproduct"—it would be impossible to produce an exactly similar passport without knowing, how the face of the user looks like and how the friction ridges of their fingers are formed. On the other hand, only the proper governmental authority knows how to appropriately produce all the technical details of a passport. Additionally, the authority will only agree to produce the passport after properly ensuring that the person who presents the face image and fingerprints has been reliably identified. Thus, the passport authority has a role comparable to that of a trust provider both in ensuring the identity and in producing the "cryptoproduct" therefrom.

FIG. 1 illustrates on the left an arrangement 100 for establishing a digital identity for a party. In this case said party is the user of a user device 110. Said arrangement comprises a random data generator 101, the acronym TRNG of which comes from True Random Number Generator. For purposes that become more apparent in the description below, it is advantageous to utilise as the random data generator 101 a dedicated apparatus like an integrated circuit specifically built for this purpose. Most advantageously, the random data generated by the random data generator 101 contains the highest possible entropy available from state-of-the-art technology. One instance of the output of the random data generator 101 is shown in FIG. 1 as the secret random number 102. For convenient and concise reference, the secret random number 102 may also be called a crypto seed. For purposes of concise reference later in this text, it may also be designated with the designator $P_{U0}$.

The user device 110 comprises at least one of input means 111 and device circuitry 112 capable of producing what is shown as the user's secret 113 in FIG. 1. If present, the input means 111 may comprise for example a set of keys, a touch pad, a touch-sensitive display, a fingerprint scanner, an iris scanner, a digital camera, and/or a microphone. The user may utilise any such input means 111 to input a unique piece of digital information as the user's secret 113 to the user device 110 at will. Such a unique piece of digital information may be for example a memorized PIN code, a biocredential such as a fingerprint, or a piece of digital information read from a bioimplant of the user. If used for generating the user's secret 113, the device circuitry 112 may comprise a random data generator or the like. Producing the user's secret 113 in the user device may comprise additional operations, like calculating a hash or some other cryptographic result of one or more initial pieces of digital data that may come from the input means 111, the device circuitry 112, or both. As a non-limiting example, the user's secret 113 may be a 256-bit hash calculated with a unidirectional hashing algorithm, such as the Argon2 hash for example, from one or more initial pieces of digital data. The user's secret 113 may also be called the User's Secret Salt or USS.

For the purposes of the following description, it is important to note that the crypto seed or $P_{U0}$ 102 and the USS 113 come from two separate environments completely independently of each other. In the embodiment shown in FIG. 1, the crypto seed or $P_{U0}$ 102 is stored for possible further retrieval in the arrangement 100, as shown by block 103. Such storing may take the form of creating a so-called provisional encrypted archive specific to the user. In this text, the acronym KUA (Keystore User Archive) is used, so that at this stage, the provisional encrypted archive containing the crypto seed or $P_{U0}$ 102 (and possibly other data specific to the user) may be designated as KUA ($P_{U0}$, . . . ). It is also possible to call all encrypted archives by the acronym VUA (Vault User Archive) when they are stored at the arrangement 100 and not the user device 110.

Similarly, the USS 113 is stored for possible further retrieval in the user device 110, as shown by block 114. In some embodiments, it is advantageous not to store the USS 113 in the user device 110 at all, but to require the user to reproduce the USS 113 every time it is needed. For example, the user may be required to memorize a PIN code or password and to input it as a user's secret (USS) every time it is needed. Additionally, or alternatively, the user may be required to allow the user device 110 to read a biometric identifier like a fingerprint, iris scan, bioimplant, or the like every time when the USS 113 is needed.

A secure transport mechanism 120 exists between the user device 110 and the arrangement 100. The exact nature of the secure transport mechanism 120 is not important, as long as it offers communications security at least comparable to that obtainable with the TLS (Transport Layer Security) protocol at the time of writing this text. In preferable embodiments, cryptographic protection of the data content, such as encryption with shared keys or dedicated key pairs may be used between the parties, which also makes the further nature of the secure transport mechanism 120 less important. As an example, the secure transport mechanism 120 may be a communications connection through one or more digital networks, protected by the TLS protocol. As an alternative, it may be something completely else like the user being physically present and utilising a display, a cable, or some other output means of the user device 110 to convey information to corresponding input means of the arrangement 100.

In this example the secure transport mechanism 120 is bidirectional, which means that both the arrangement 100 and the user device 110 comprise a receiving end and a transmitting end of the secure transport mechanism 120. For the convenience of setting up and maintaining communications, the two directions of the secure transport mechanism 120 may utilise the same technology. However, this is not a requirement and the two directions may go through different technologies.

Advantageously, but not obligatorily, more than one message may be exchanged between the arrangement 100 and the user device 110 through the secure transport mechanism 120, even if only the transmission of the user's secret 113 is explicitly shown in FIG. 1. As an example, the user device 110 may transmit to the arrangement 100 a certain public key $PK_{URT}$, and the arrangement 100 may respond by transmitting to the user device 110 another public key $PK_{UAT}$, which it generated from a corresponding secret key $SK_{UAT}$ for example using the Curve25519 Elliptic Curve Diffie-Hellman method. The subscripts URT and UAT come from User Request Token and User Access Token respectively and are introduced here for concise reference without any limiting effect.

If the URT- and UAT-related keys have been exchanged as in said example, one possible way to securely transmit the user's secret 113 from the user device 110 to the arrangement 100 is by utilising the AES256-GCM encryption method, where the acronym AES comes from Advanced Encryption Standard and the acronym GCM comes from Galois/Counter Mode. Using the notations introduced above, the corresponding transmission through the secure transport mechanism 120 may be expressed as $$\text{AES256-GCM}(\text{SHA2}(X25519(SK_{URT},PK_{UAT}) \| PK_{URT} \| PK_{UAT} \| n),m,n,\text{USS})$$

where SHA2( ) denotes performing the Secure Hash Algorithm 2 performed on the argument in parentheses and X25519( ) denotes applying the Curve25519 Elliptic Curve Diffie-Hellman method on the argument in the parentheses. The letter m denotes a MAC or message authentication code for the encryption authentication tag and the letter n denotes a cryptographic nonce. The double vertical line $\|$ means a bitwise logical OR operation.

Having received the user's secret 113 through the secure transport mechanism 120, the arrangement 100 is configured to perform an encrypting operation 104. The term "operation" may be understood to mean both the action of encrypting and the means for performing such encrypting. In addition to or in place of encrypting, other cryptographic operations could be used. For generality, it may be said that the arrangement 100 comprises a first cryptographic operation 104 coupled to said random data generator 101 and said receiving end of the secure transport mechanism 120.

In the embodiment of FIG. 1, the crypto seed or $P_{U0}$ 102 constitutes an input to the encrypting operation 104 and the user's secret 113 received through the secure transport mechanism 120 constitutes an encryption key to the encrypting operation 104. The output of the encrypting operation 104 is a digital identity 105 of the user. In other words, the arrangement 100 is configured to produce, through said first cryptographic operation 104, a cryptographic intermediate product 105 that is deterministically dependent on both said crypto seed ($P_{U0}$) 102 and the user's secret (USS) 113 received through said secure transport mechanism (120), which cryptographic intermediate product (105) constitutes said digital identity of the user. FIG. 2 illustrates an alternative, in which the (first) cryptographic operation 204 is a hashing operation, in which the crypto seed or $P_{U0}$ 102 constitutes an input and the user's secret or USS 113 constitutes a salt.

Irrespective of the exact nature (encryption, hashing, etc.) of the first cryptographic operation 104 its output—i.e. the cryptographic intermediate product 105—is a unique, unpredictable random entity, which has not been produced through any mathematical operation. The last-mentioned means that, although the first cryptographic operation 104 as such is mathematical, the mutual independence of its inputs (the crypto seed or $P_{U0}$ 102 and the user's secret or USS 113) makes the generating operation as a whole not mathematical.

In terms of entropy, the randomness of said unique, unpredictable random entity is of as high quality as that of the crypto seed or $P_{U0}$ 102. This holds true irrespective of whether or not its generation was salted (or keyed) by the externally obtained user's secret or USS 113. Consequently, the randomness of said unique, unpredictable random entity is potentially even quantum resistant. Yet, it is fully reproducible if only its two original components (the crypto seed or $P_{U0}$ 102 and the user's secret or USS 113) are available, for example retrieved from their respective storage locations 103 and 114. In the case of the USS 113, being available may mean requiring the user to give it once more, as explained earlier.

The bit count in said unique, unpredictable random entity may be equal to the sum of the bit counts of the crypto seed or $P_{U0}$ 102 and the user's secret or USS 113. However, it may be advantageous to select the cryptographic operation 104 so that it produces at once a very large result, for example one with several million bits, which can then be utilised further for various cryptographic purposes.

Such further cryptographic purposes are generally represented in FIG. 1 with the further cryptoalgorithm block 106. The further cryptoalgorithm or second cryptographic operation 106 may be for example a key generation algorithm: the user's digital identity 105 is a piece of high-quality cryptographic random data, so a trust provider may utilise it for e.g. key generation (generating keys for asymmetric or symmetric encryption system or both). Additionally, or alternatively, the user's digital identity 105 may be used as a cryptographic nonce, a cryptographic salt, and/or a crypto seed for generating key pairs for certificates. All such possible uses are generally covered by the further cryptoalgorithm block 106.

In general, the arrangement may be said to be configured to produce, through said further cryptoalgorithm or second cryptographic operation 106 and using the digital identity 105 of the user, a cryptographic output 107. For reasons that are explained in more detail later in this text, it is advantageous to include the crypto seed ($P_{U0}$) 102 in encrypted form as a part of the cryptographic output 107.

It is advisable to not store the user's digital identity 105 any longer than what it takes to immediately utilise it for the purposes of the further cryptoalgorithm or second cryptographic operation 106. As shown schematically in the lower left part of FIG. 1, the arrangement 100 is configured to thereafter permanently obfuscate the digital identity 105 from memory. At least in theory, leaving it available as such in some storage might allow later exposing at least one of the two original secrets (the crypto seed or $P_{U0}$ 102 and the user's secret or USS 113). It is in any case possible that some revealing vulnerability is found in the encrypting or hashing function 104, and/or that the user's secret or USS 113 becomes exposed, in which case said risk would become reality.

FIGS. 3 to 6 illustrate examples of first and second cryptographic operations in the arrangement 100 of FIGS. 1 and 2. Reference number 102 is used for a crypto seed (also called $P_{U0}$ above) produced by a high-quality random data generator in the arrangement of the trust provider, and reference number 113 is used for a user's secret (also called USS above) received from the user through a secure transport mechanism. Features common to all embodiments of FIGS. 3 to 6 are that the arrangement is configured to produce, through a first cryptographic operation, a cryptographic intermediate product that is deterministically dependent on both said crypto seed and said user's secret. The cryptographic intermediate product constitutes a digital identity of the user. Also common to these embodiments is that the arrangement is configured to produce, through a second cryptographic operation and using said digital identity of the user, a cryptographic output including said crypto seed in encrypted form.

Figure 3:
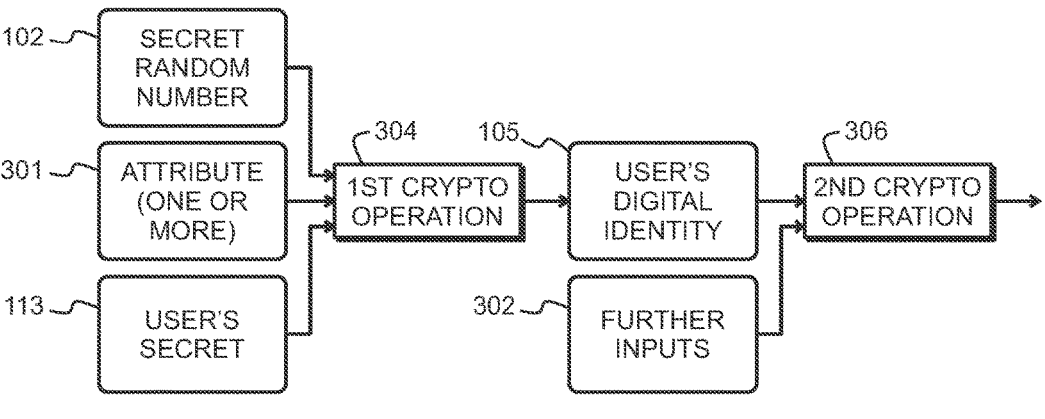
FIG. 3 illustrates one possible more detailed example of an action shown in FIG. 1.

In the embodiment of FIG. 3, there are three inputs to the first cryptographic operation 304: the crypto seed 102, the user's secret 113, and one or more attributes 301. Preferably, but not necessarily, the attributes 301 are user-specific attributes pertinent to the particular user, the digital identity of which is to be generated. Additionally, or alternatively, at least one of the attributes relates to a trust provider having verified the user's certificate; for example, an identifier of the trust provider may be used as an attribute. The first cryptographic operation 304 may comprise for example one or more encrypting and/or hashing operations, from which the user's digital identity 105 comes as a cryptographic intermediate product. This and possible further inputs 302 may go as inputs to the second cryptographic operation 306. FIG. 3 does not take any position on how the cryptographic output from the second cryptographic operation 306 may look like or how it should be designated. Examples of these are described in more detail later.

Figure 4:
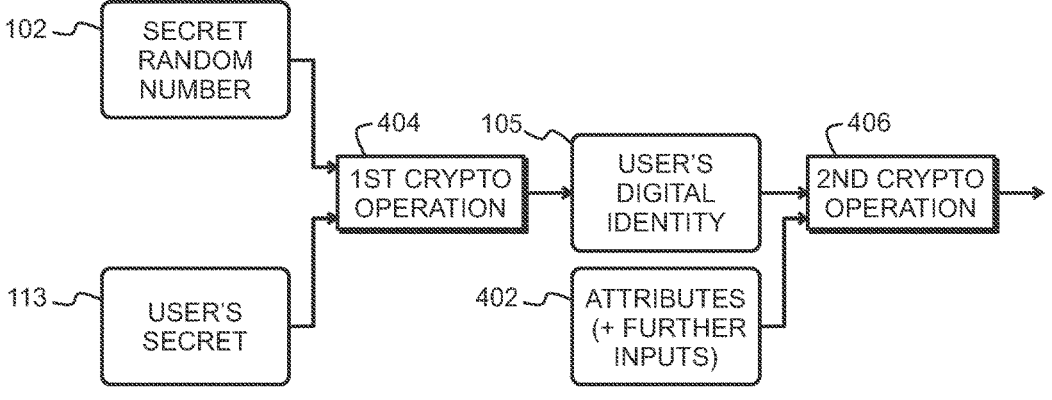
FIG. 4 illustrates one possible more detailed example of an action shown in FIG. 1.

The embodiment of FIG. 4 differs from that of FIG. 3 in that no attributes are taken as inputs to the first cryptographic operation 404. Thus, the cryptographic intermediate product (the user's digital identity 105) depends solely on the crypto seed 102 and the user's secret 113. Attributes and possible further inputs are shown in block 402 as one of the inputs to the second cryptographic operation 406, much like above in the embodiment of FIG. 3.

Figure 5:
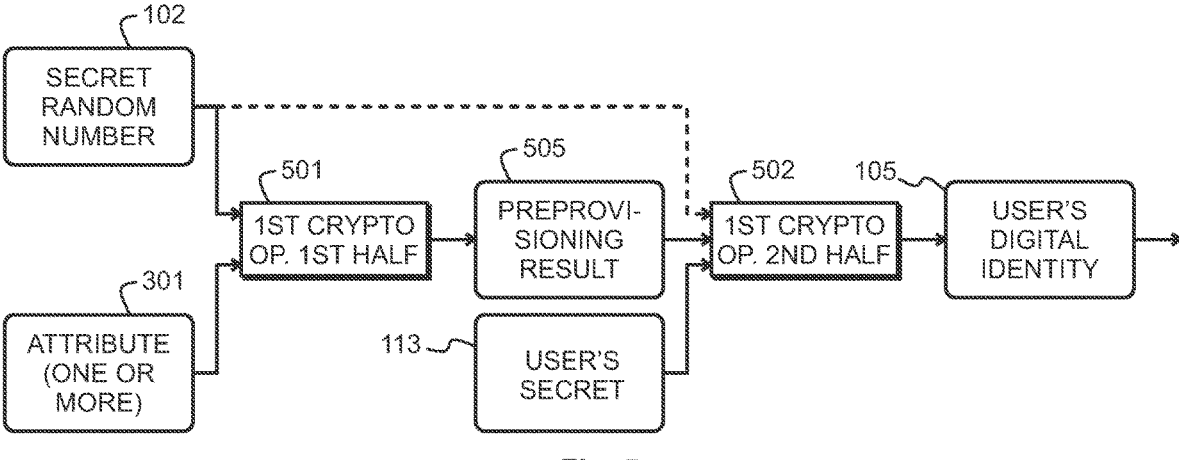
FIG. 5 illustrates one possible more detailed example of an action shown in FIG. 1.

The embodiment of FIG. 5 differs from those of FIGS. 3 and 4 in that it includes so-called pre-provisioning, which is performed without using the user's secret as input. The pre-provisioning is shown in FIG. 5 as the first half 501 of the first cryptographic operation, and the arrangement may perform it for example before it has received the user's secret 113 through the secure transport mechanism. Inputs to the pre-provisioning include the crypto seed 102 and one or more attributes 301 pertinent to the user. The pre-provisioning result 505 may comprise for example a so-called provisional encrypted archive specific to the user for which the pre-provisioning is performed.

The second half of the first cryptographic operation is shown as 502 in FIG. 5. One of its inputs is the user's secret 113. The pre-provisioning result 505 or at least some part of it may go as an input to the second half 502 of the first cryptographic operation. Additionally, or alternatively, the crypto seed 102 may go as an input to the second half 502 of the first cryptographic operation. The output thereof is the user's digital identity 105. Like in the other embodiments, the user's digital identity 105 is a cryptographic intermediate product that can be taken to a second cryptographic operation of any kind described in this text, possibly together with attributes and/or further inputs like in FIGS. 3 and 4.

Figure 6:
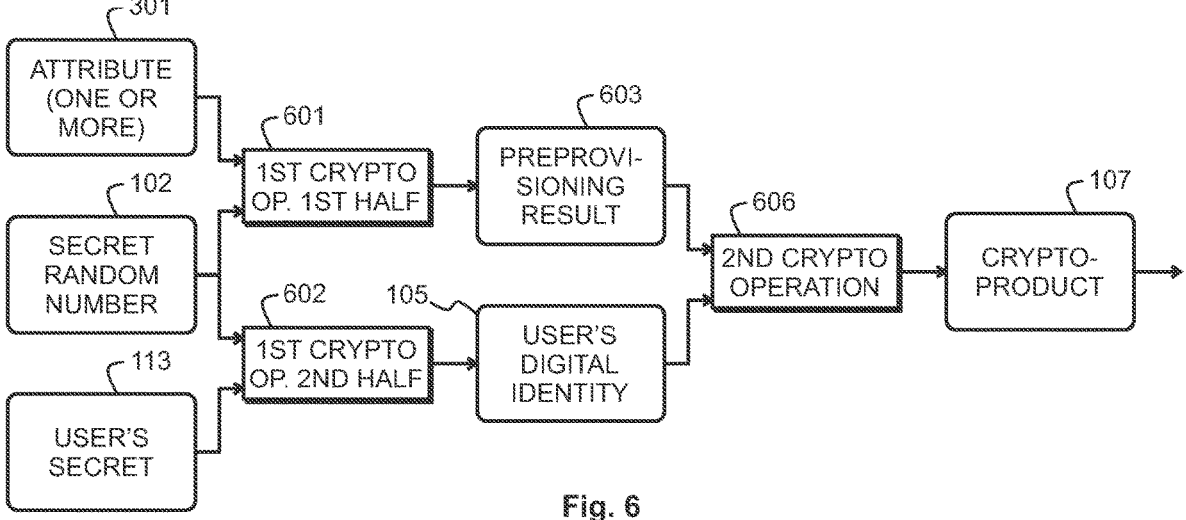
FIG. 6 illustrates one possible more detailed example of an action shown in FIG. 1.

The embodiment in FIG. 6 resembles that of FIG. 5 in that pre-provisioning is made also here. The pre-provisioning is shown as the first half 601 of the first cryptographic operation. Much like in FIG. 5, the inputs to the pre-provisioning are the crypto seed 102 and one or more attributes 301, and the pre-provisioning may be performed before any user's secret has been received. The pre-provisioning result 603 may comprise a provisional encrypted archive specific to the user.

An advantageous application of the pre-provisioning principle is to create, through pre-provisioning, a digital signing certificate for a party who is not yet "in existence" (in the form of having personally made contact with the trust provider) but for which certain attributes are known already. Such a digital signing certificate may remain unchanged also in future use. For example, an official authority may create such a digital signing certificate for a person who has not yet given a USS of their own to the authority. The trust provider (in said example the authority) can regenerate a public signing key for such a user on the basis of the attributes. The USS that will later be obtained from the user does not affect the digital signing certificate.

The second half 602 of the first cryptographic operation is one that takes the crypto seed 102 and the user's secret 113 as inputs and produces the user's digital identity 105 as a cryptographic intermediate product. The user's digital identity 105 and the pre-provisioning result 603 constitute inputs to the second cryptographic operation 606. Also other inputs to the second cryptographic operation 606 may exist, although not shown in FIG. 6. The cryptographic output shown as the cryptoproduct 107 in FIG. 6 includes at least the crypto seed in encrypted form.

Figure 7:
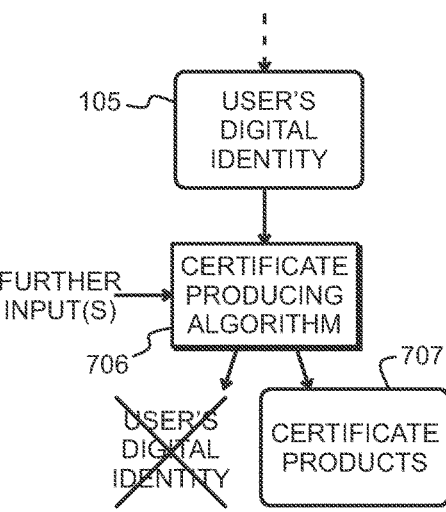
FIG. 7 illustrates one possible more detailed example of an action shown in FIG. 1.

FIG. 7 illustrates an example, in which the further cryptographic algorithm or second cryptographic operation (shown as 106 in FIG. 1; also reference designators 306, 406, and 606 above) is a certificate producing algorithm 706. In addition to the user's digital identity 105, it may take also other inputs like attributes that the certificate is to contain and/or further keys that are needed to properly produce the desired certificate products 707. Similar to what was said earlier, there may be zero, one, or more attributes and the attributes may relate to the user, the trust provider, or both. In general, the arrangement may be configured to produce, through the further cryptographic algorithm or second cryptographic operation, a cryptographic certificate of the user as a part of its cryptographic output.

Figure 8:
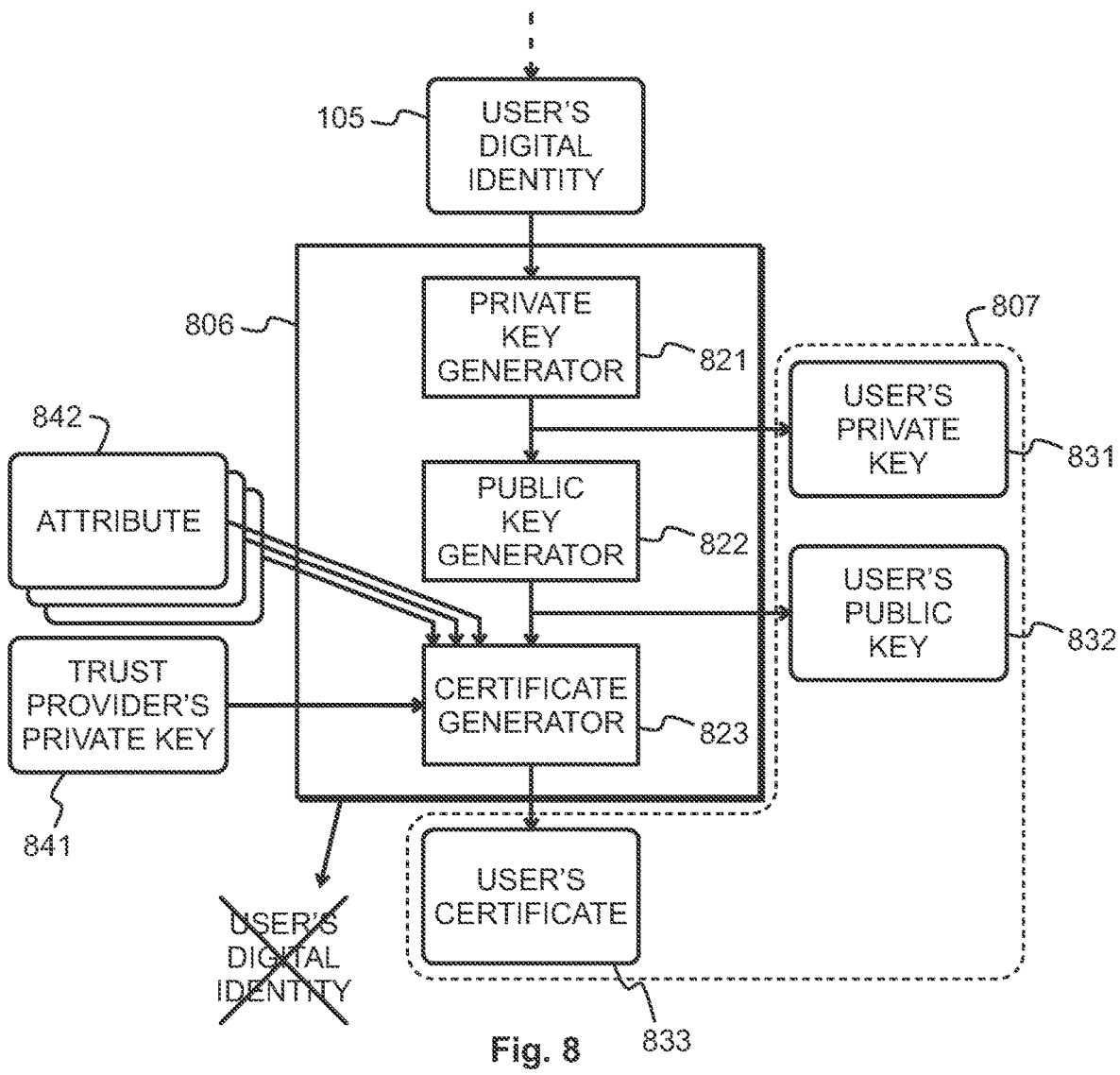
FIG. 8 illustrates one possible more detailed example of an action shown in FIG. 1.

In the example shown in FIG. 8, the concept of FIG. 7 is elaborated slightly further. As parts of a particular kind of a certificate producing algorithm 806 are a private key generator 821, a public key generator 822, and a certificate generator 823. The arrangement is configured to use the user's digital identity 105 as an input to the private key generator 821 to generate the user's private key 831. Further, the arrangement is configured to use the generated private key as an input to the public key generator 822 to generate the user's public key 832. The certificate generator 823 essentially signs the generated public key using the trust provider's private signing key 841. Along to the signing operation may possibly come a selection of attributes 842. The arrangement may have received the attributes—preferably in encrypted form—for example from service providers, the services of which the user is planning to use after having received the necessary certificate 833. One or more attributes related to the trust provider may also be used. Compared to the more conceptual level in FIG. 7, the user's private and public keys 831 and 832 and the certificate 833 together form the certificate products 807 that are the useful output of the certificate producing algorithm 806.

FIG. 8 is thus one example of an embodiment in which the arrangement is configured to use the digital identity 105 to generate a cryptographic output for the party in question. Additionally, in the embodiment of FIG. 8, the arrangement is configured to generate a certificate of said party by signing at least a part of the cryptographic output with a signing key 841 of the arrangement. In this embodiment, the arrangement is configured to generate, as a part of the cryptographic output, a public key 832 of a further pair of keys 831 and 832 of an asymmetric encryption system, from said digital identity 105. An example of generating such a public key 832 is to first generate a secret key 831, called $SK_{UID}$ here, for the user as $$SK_{UID}=\text{Argon2Id}(P_{U0},\text{USS})$$

where Argon2Id( ) means utilising the Argon2 hash algorithm, and then proceed to generate a corresponding public key $PK_{UID}$ as $$PK_{UID}=X25519(SK_{UID})=X25519(\text{Argon2Id}(P_{U0}, \text{USS})).$$

As the Argon2 algorithm is computationally quite intensive, it is possible to use some more straightforward generation methods like the SHA2 algorithm so that $$PK_{UID}=X25519(SK_{UID})=X25519(\text{SHA2}(P_{U0}\|\text{USS})).$$

The result of possible signing of the public key $PK_{UID}$ with a signing key of the arrangement 100 may be designated as $SIGN_{UID}$. One possible cryptoproduct to be produced is a finalized encrypted archive specific to the user. Information elements included in such a finalized encrypted archive may comprise for example the crypto seed $P_{U0}$, the public key $PK_{UID}$, the certificate $SIGN_{UID}$, and others. As an encryption key, the arrangement may use for example the user's secret USS. In such a case, the finalized encrypted archive could be designated as $$\text{Enc}(\text{USS},\text{KUA}(P_{U0},PK_{UID}, SIGN_{UID}, \ldots )).$$

FIGS. 1 to 8 do not take any position concerning what the arrangement will subsequently do with the output, i.e. the cryptoproduct 107 and/or certificate products 707 or 807. As for example the keys 831 and 832 are primarily meant for use by the user device 110, a natural possibility is that the arrangement 100 is configured to transmit a response to the user device 110, for example through the same or similar secure transport mechanism 120 as in FIG. 1, conveying at least the keys 831 and 832 to the possession of the user device 110. Also the certificate 833, if generated like in the case of FIG. 8, may be conveyed. In general, the arrangement 100 is configured to transmit at least part of the cryptographic output 107 through said secure transport mechanism 120.

Using the notations introduced earlier, one possible way to encrypt at least part of the cryptographic output 107 is to first generate an encryption key $K_{KUA}$ as $$K_{KUA}=SHA2(X25519(SK_{UAT},PK_{URT}) \\ \|PK_{UAT}\|PK_{URT}\|n)$$

and then use it to encode the finalized encrypted archive as $$Enc(K_{KUA},KUA(P_{U0}, \dots)).$$

Figure 9:
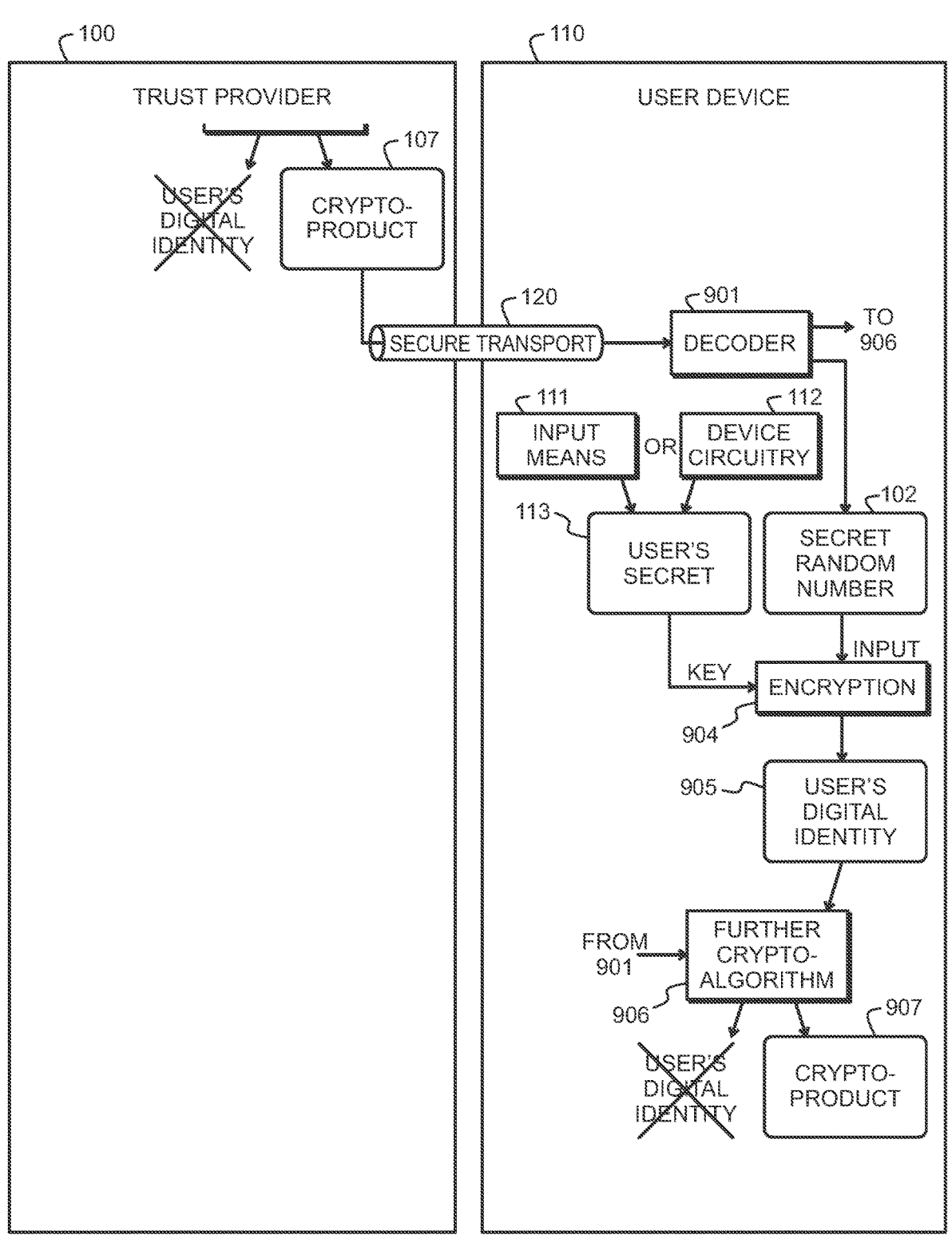
FIG. 9 illustrates actions taken by a user device and a trust provider in an example embodiment.

FIG. 9 illustrates one possible way in which at least part of the cryptographic output 107 may be utilised in the user device 110 after being received through the secure transport mechanism 120. Assuming that the crypto seed $(P_{U0})$ 102 in encrypted form was a part of the cryptographic output 107 received at the user device, a decoder 901 may be configured to extract it as shown by the appearance of the crypto seed $(P_{U0})$ 102 in FIG. 9. The user device may retrieve the user's secret (USS) 113 from a secure storage or require the user to input it once more, after which the user device 110 may reproduce the user's digital identity 905 by applying a similar (first) cryptographic operation 904 as the arrangement 100 did in step 104 of FIG. 1 (or step 204 of FIG. 2, or any corresponding steps in FIGS. 3 to 6). The capability of the user device 110 to reproduce the user's digital identity 905 means that after receiving the response from the arrangement 100 as in FIG. 9, the user device 110 is independent of the arrangement 100 concerning all later uses of cryptoproducts that are or can be derived from the user's digital identity 905. Returning briefly to the passport example discussed earlier in this text, the user has now received a "passport" issued by the trust provider. The role of the crypto seed $(P_{U0})$ 102 in generating the "passport", as well as the appropriate cryptographic measures taken in delivering it to the user device 110, ensure that further cryptoproducts 907 derived by the user device 110 by applying further cryptographic operations 906 can be digitally verified at a sufficiently reliable level by any third parties with whom the user wishes to communicate using the user device 110.

As shown in FIG. 9, the decoder 901 in the user device 110 may extract also other useful parts of the received cryptoproduct 107. Some such extracted parts may have a role as inputs to the further cryptographic operations 906. It may prove advantageous not to keep the user's digital identity 905 stored in the user device 110 either, at least not for long periods of time. The user device 110 may reproduce the user's digital identity 905 at any time anyway, possibly requiring the user to input the user's secret 113 once more. Correspondingly, FIG. 9 shows the user device obfuscating the user's digital identity 905 from memory immediately after executing any of the possible further cryptographic operations 907.

Figure 10:
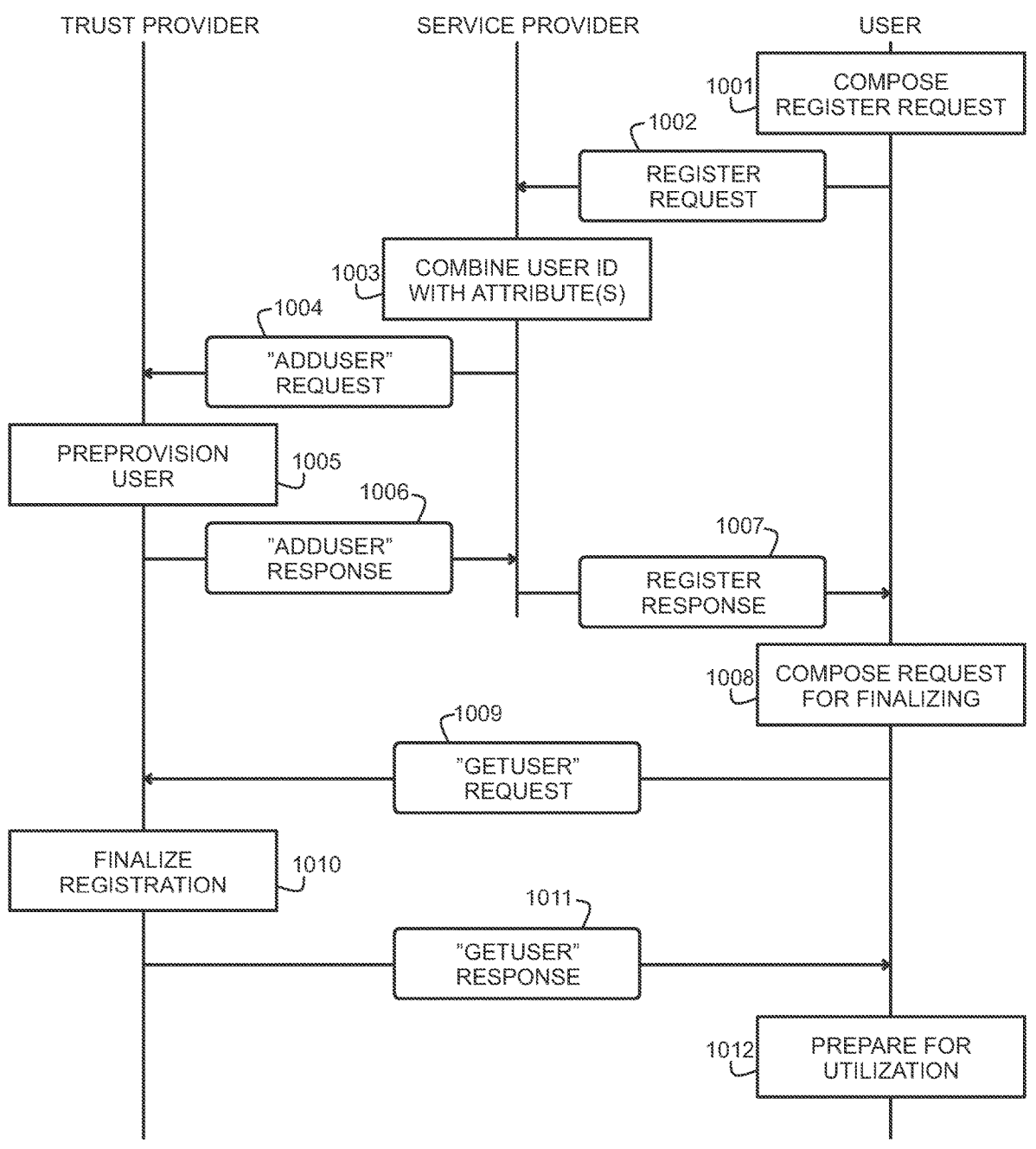
FIG. 10 illustrates actions taken and messages exchanged between a user device, a service provider, and a trust provider in an example embodiment.

FIG. 10 shows an example of how the principles explained above can be applied in actions taken and messages exchanged between a user, a service provider, and a trust provider in an example embodiment. Although the actors are named as parties in FIG. 10, the actions described herein are most naturally actions taken by devices and/or apparatuses that are possessed by and/or operated on behalf of such parties. Thus, for example, the actions described herein with reference to the leftmost vertical column in FIG. 10 are actions of an arrangement such as that above in FIGS. 1-4. The reference to a "service provider" must be understood in a wide sense, so that in addition to private companies, also authorities and the like can be considered service providers. As an alternative, the party considered here as the service provider could be considered as an RA (Registration Authority). FIGS. 11-16 are referred to showing more detailed examples of how certain actions may advantageously take place in FIG. 10.

A characteristic feature of FIG. 10 is that it shows a two-step process at the trust provider's end. The two steps may be called a pre-provisioning step and a registration finalizing step, resembling the description of FIGS. 5 and 6 above. In the first step, essentially the service provider (i.e. the party shown in the middle in FIG. 10) makes the actual request for generating a digital identity of the user. The service provider does so in respect of a user who at that stage is already known to the service provider and with whom the service provider has already established a trust relationship. How the corresponding previous operations looked like is of minor importance here, but it may be assumed that establishing the trust relationship was completed in customer service, or by a registration authority, or via an eIDAS approved model. The acronym eIDAS refers to the regulation on electronic identification, authentication, and trust services established by the European Union in 2014.

The service provider has thus somehow identified the user and wants the trust provider to create a protected archive with certain attributes bound to a unique identifier of the user. The unique identifier meant here does not need to be secret or confidential in any way, as long as it can be associated with the correct user with reasonable reliability. For example, the MSIN (mobile subscription identification number), or more familiarly the mobile phone number, of the user may serve as the unique identifier. The acronym UID is used in this text to denote the unique identifier for short.

In FIG. 10, at step 1001 the user composes a message and sends it as a register request 1002 to the service provider. The register request 1002 may be sent for example as an SMS (i.e. text message according to the Short Message Service standard), which involves the advantage that the UID (the mobile phone number) of the user comes along automatically and can be easily recognized by the service provider.

Figure 11:
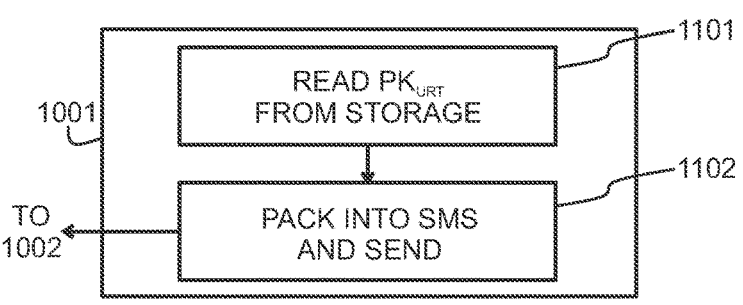
FIG. 11 illustrates one possible more detailed example of an action shown in FIG. 10.

According to an embodiment, as payload the register request 1002 may contain a public key of the user. The term payload refers to message content; in addition, there may be metadata and/or header information or the like as defined by one or more communications protocols. As shown in substep 1101 FIG. 11, the user device may read a public key $PK_{URT}$ from a storage such as a protected keystore. Alternatively, the user device may generate the public key $PK_{URT}$ on the fly for this particular purpose. The acronym URT in the subscript refers to the words User Request Token. As an example, the public key $PK_{URT}$ may be a 256-bit output (expressed as RNG (256)) from a random number generator in the user device. Substep 1102 in FIG. 11 represents the e user device composing and sending the register request 1002 shown in FIG. 10.

At step 1003, the service provider associates the UID with the desired attributes and prepares what becomes the request for generating a digital identity of the user. In FIG. 10, the request is shown as the AddUser request 1004. A secure transport mechanism should be used to convey the AddUser request 1004 to the trust provider. As an example, the AddUser request 1004 may be conveyed through a communications connection through one or more digital networks, protected by the TLS protocol. As it will trigger the pre-provisioning step at the trust provider's end, the AddUser request 1004 may also be called a pre-provisioning request.

Figure 12:
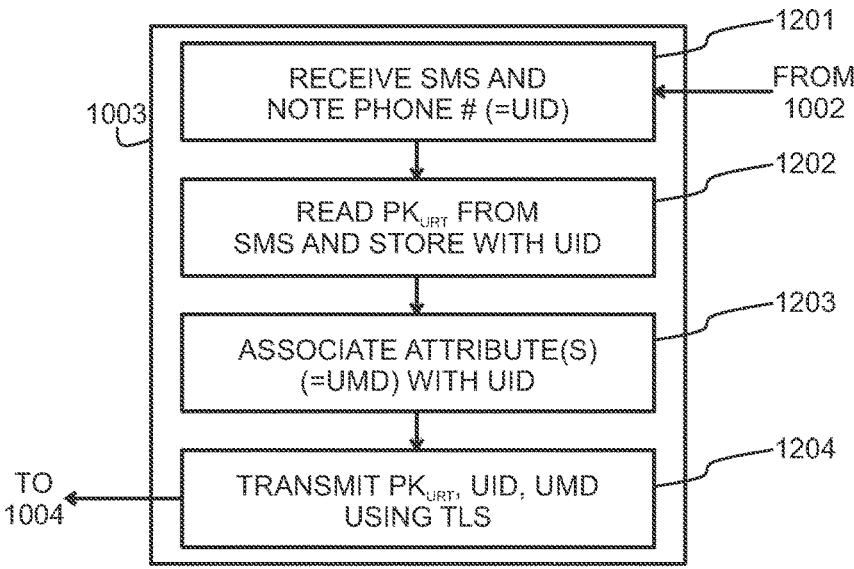
FIG. 12 illustrates one possible more detailed example of an action shown in FIG. 10.

The AddUser request may contain, or be at least reliably indicative of, the identifier (UID) of the user and at least one attribute of the user. The acronym UMD, as in User Meta Data, can be used to generally represent the one or all attributes that are to be associated with the user and are stored in the protected archive that the service provider requests the trust provider to create. In short, the AddUser request 1004 should thus contain—or at least be reliably indicative of—the $PK_{URT}$, the UID, and the UMD. An example of the actions taken by the service provider at step 1003 is shown in FIG. 12, where substep 1201 corresponds to receiving the register request 1002 from the user and noting the UID, substep 1202 corresponds to reading and storing the contents of the register request 1002, substep 1203 corresponds to associating the desired attributes with the UID, and substep 1204 corresponds to preparing and transmitting the AddUser request 1004 to the trust provider.

In the explanation above, it was assumed that the public key $PK_{URT}$ originated from the user and not from the service provider. A natural consequence thereof is that a corresponding secret key $SK_{URT}$ is solely in the possession of the user, assumedly stored in a secure keystore of the user device. A further consequence thereof is that if some piece of information somewhere becomes encrypted with the public key $PK_{URT}$, only the user may later decrypt that piece of information, using their secret key $SK_{URT}$. According to an alternative embodiment, the service provider may compose and transmit the AddUser request 1004 without first receiving the register request 1002 from the user, or at least without receiving any public key $PK_{URT}$ from the user. If desired, in such a case it may be the service provider who includes a corresponding public key in the payload of the AddUser request, keeping the corresponding secret key stored in a secure keystore of the service provider. That in turn would mean that if some piece of information somewhere becomes encrypted with the public key of the service provider, only the service provider may later decrypt that piece of information, using their secret key. This consideration has certain important implications in the next steps explained below.

Step 1005 in FIG. 10 is the pre-provisioning step performed by the trust provider. As a general characterisation, a pre-provisioning functionality in the arrangement of the trust provider is configured to respond to a received pre-provisioning request (the AddUser request 1004), indicative of an identifier (UID) and at least one attribute (UMD) of a party, by establishing a provisional secret for said party and transmitting out a pre-provisioning response (the AddUser response 1006 in FIG. 10) containing at least a part of said provisional secret. Additionally, said pre-provisioning functionality is configured to use a crypto seed (compare to 102 in FIG. 1) provided by a random data generator (compare to 101 in FIG. 1) to encrypt and store said identifier (UID) and said at least one attribute (UMD) into a provisional encrypted archive specific to said party.

A noteworthy detail is that in the embodiment of FIG. 10, at step 1005 the trust provider does not yet possess anything comparable to the user's secret 113 that was described earlier with reference to FIG. 1. Thus, at this step the trust provider cannot yet generate a proper digital identity of the user, as that would require subjecting both random data provided by the internal random data generator and a further secret obtained from the user to a cryptographic operation. Hence, the designation "pre-provisioning".

Figure 13:
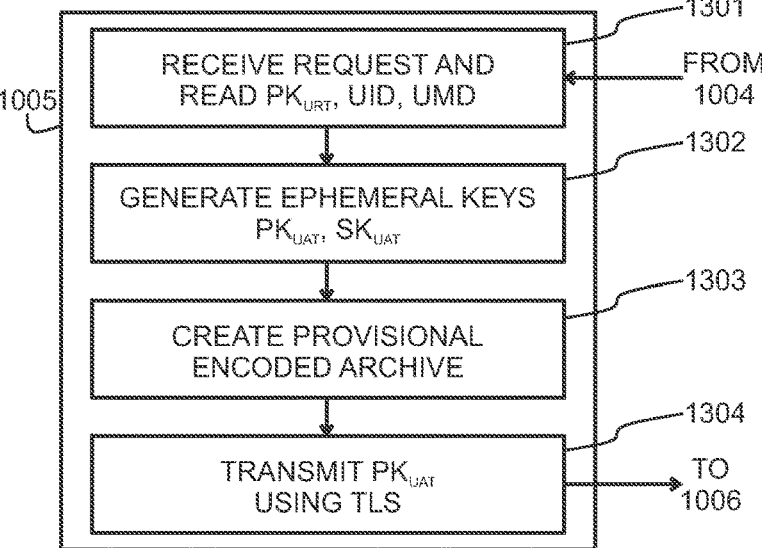
FIG. 13 illustrates one possible more detailed example of an action shown in FIG. 10.
Figure 16:
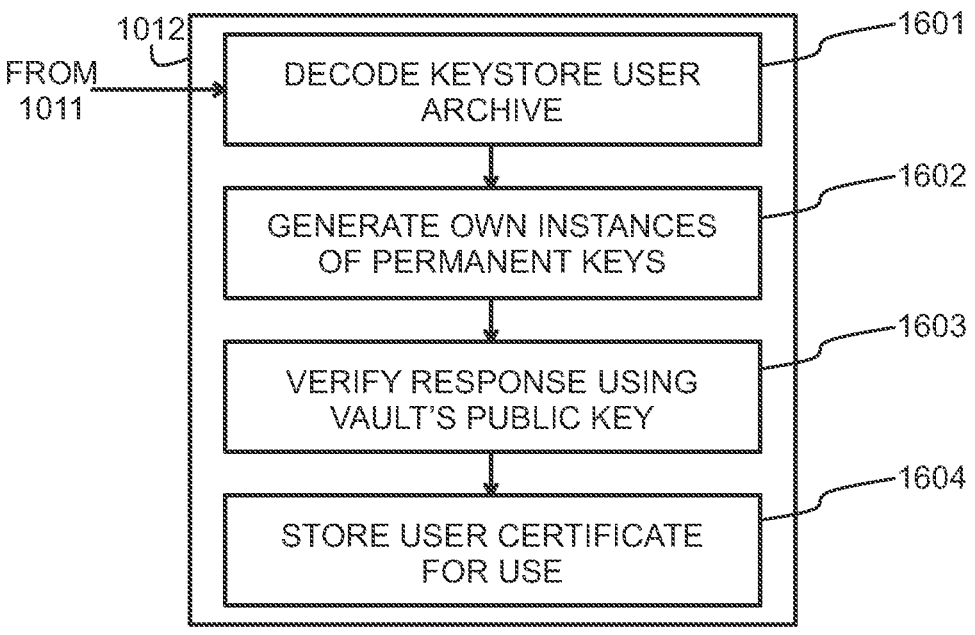
FIG. 16 illustrates one possible more detailed example of an action shown in FIG. 10.

FIG. 13 illustrates an example of substeps that may be included in step 1005 of FIG. 10. At substep 1301, the arrangement receives the AddUser request 1004 and reads its contents, i.e. the $PK_{URT}$, the UID, and the UMD. Substep 1302 represents establishing a provisional secret for the user. In this example, the provisional secret comprises a pair of keys of an asymmetric encryption system. These keys are meant to be used only once in subsequent communications between the user and the trust provider, for which reason they are here called a pair of ephemeral keys of the asymmetric encryption system. In the acronym notation they are designated as $PK_{UAT}$ and $SK_{UAT}$. Where the subscript UAT comes from the words User Access Token. A crypto seed from the random data generator is most advantageously utilised in establishing the provisional secret for the user.

As a specific, non-limiting example, the pre-provisioning functionality may be configured to use a 256-bit random number provided by said random data generator as the secret key $SK_{UAT}$ of said pair of ephemeral keys, and generate the public key $PK_{UAT}$ of said pair of ephemeral keys from said secret key $SK_{UAT}$ of said pair of ephemeral keys using the Curve25519 Elliptic Curve Diffie-Hellman method.

Substep 1303 represents creating the provisional encrypted archive specific to the user. For encrypting, it is advantageous to use a so-called shared secret, which is (or will be) shared between the trust provider and the user. In the alternative case where the previously mentioned public key $PK_{URT}$ originated from the service provider and not from the user, also the shared secret used at this stage may be shared between the trust provider and the service provider.

The designation $SS_{UST}$ is utilised here for the shared secret used for creating the provisional encrypted archive at substep 1303. The acronym UST in the subscript comes from the words User Session Token. One advantageous way to create the $SS_{UST}$ is to perform a scalar multiplication of the secret ephemeral key $SK_{UAT}$ and the public key $PK_{URT}$ received in the AddUser request; in other words, $$SS_{UST} = \text{scalarmult}(SK_{UAT}, PK_{URT}).$$

The "scalarmult" notation above (essentially meaning scalar multiplication) could also be expressed as using the X25519 or Curve25519 method. The advantage gained is the resulting mathematical link between key pairs. Both parties may obtain the same shared secret, each using its own secret key and the other party's public key.

Using similar notation, and using the acronym KUA (Keystore User Archive) for the stored payload, the provisional encrypted archive may be designated as $$\text{Enc}(SS_{UST}, KUA \sim (UID, UMD, P_{U0}, \ldots))$$

As the origins of the secret ephemeral key $SK_{UAT}$ is in a crypto seed obtained from the random data generator, this exemplary process obeys the characterisation presented earlier, according to which the pre-provisioning functionality is configured to use such a crypto seed in creating the provisional encrypted archive. According to a more formalistic characterisation, the pre-provisioning functionality may be configured to generate the shared secret $SS_{UST}$ through a first mathematical operation using the secret ephemeral key $SK_{UAT}$ and the public key $PK_{URT}$ received from an entity external to the arrangement, and use said first shared secret $SS_{UST}$ in said encrypting and storing of said identifier UID and said at least one attribute UMD into said provisional encrypted archive.

Substep 1304 in FIG. 13 represents the previously mentioned transmitting out of a pre-provisioning response 1006, which contains at least a part of the provisional secret created at substep 1302. In particular, the pre-provisioning response may convey the public key $PK_{UAT}$ of the generated pair of ephemeral keys.

In the embodiment of FIG. 10, the service provider has only a minor role in forwarding the AddUser response 1006 in the form of a register response 1007 to the user. One may assume, as in the case of the messages 1002 and 1004, that a TLS-protected channel or the like exists between the trust provider and the service provider, and that text messages or the like can be used between the service provider and the user. In such a case, the role of the service provider is merely to take the payload (i.e. the ephemeral public key $PK_{UAT}$) from the AddUser response 1006 and forward it in an SMS to the user. In the alternative embodiment, in which the key $PK_{URT}$ conveyed in the AddUser request of step 1004 originated from the service provider and not the user, there might be no need for the forwarded message 1007 at all and the payload of the AddUser response 1006 (i.e. the ephemeral public key $PK_{UAT}$) could stay at the service provider.

A detail to be noted is that all steps and substeps in FIG. 10 described so far may be repeated, even multiple times if needed. As an example, one may consider the alternative embodiment, in which the key $PK_{URT}$ conveyed in the AddUser request of step 1004 originated from the service provider and not the user. Such an embodiment could mean, for example, that the service provider knows already a unique identifier of the user and prepares for possible future needs of secure communications with the user, however without having received a proper register request from the user yet.

At one moment, the service provider may have a first attribute (or a first set of attributes) to associate with the unique identifier of the user. This could prompt the service provider to generate and transmit a first AddUser request, conveying the unique identifier of the user, the first (set of) attribute(s), and a key $PK_{URT}1$ generated for this purpose. As a response, the trust provider would create a first version of the provisional encrypted archive specific to the user, encrypted with a first shared secret $SS_{UST}1$, and send back a corresponding first ephemeral public key $PK_{UAT}1$.

Later, the service provider could learn something more about the user, generate a corresponding second (set of) attribute(s), and transmit a second AddUser request. This second AddUser request would convey the unique identifier of the user, the second (set of) attribute(s), and a key $PK_{URT}2$ generated for this purpose (which may or may not be the same as key $PK_{URT}1$). As a response, the trust provider would decode the first version according to the formula $$Dec(SS_{IST}1,KUA\sim(\dots))$$

and create a second version of the provisional encrypted archive specific to the user, this time encoded with an updated shared secret $SS_{UST}2$, the calculation of which used the key $PK_{URT}2$. The trust provider would send back a corresponding second ephemeral public key $PK_{UAT}2$.

This kind of rounds of communications may be repeated as many times as needed. The same applies to such embodiments in which the user did have a role, for example by initiating at least some of such rounds by sending a register request 1002. In those embodiments also each AddUser response from the trust provider (or at least the payload thereof) would naturally go all the way back to the user, as described above with respect to steps 1006 and 1007 of FIG. 10.

Step 1008 in FIG. 10 represents the user preparing and transmitting a registration finalizing request, shown in FIG. 10 as the GetUser request 1009. The purpose of such a registration finalizing request is to securely convey to the trust provider a user's secret, which was shown as 113 in the principal diagram of FIG. 1. This, in turn, will enable the trust provider to generate a digital identity of the user and utilise it appropriately, finalizing the user's registration as a second step of the process shown in FIG. 10.

In the embodiment shown in FIG. 10, the GetUser request 1009 is actually of no concern at all to the service provider, but purely something that takes place between the user and the trust provider. While there is nothing against utilising the service provider as a middleman in forwarding messages, there is no reason thereto either, so in FIG. 10 the GetUser request 1009 is shown as going directly from the user to the trust provider, assuming a secure communications channel such as a TLS-protected network connection or the like.

FIG. 14 illustrates an example of substeps that the user device may perform at step 1008 of FIG. 10. Substep 1401 represents receiving the register response 1007 and reading its contents, in particular the ephemeral public key $PK_{UAT}$. Substep 1402 represents generating one or more user-specific secrets. A first such user-specific secret may be the USS or User's Secret Salt, which may consist for example of 256 bits from a credential hash. The credential, from which such a hash would be calculated, may be for example a PIN code input to the user device by the user.

Another user-specific secret may be the key $SK_{URT}$, i.e. the secret key of the key pair of which the public key $PK_{URT}$ was transmitted to the trust provider already earlier. The key $SK_{URT}$ has been generated already earlier in such a case but not necessarily used in the previous stages of the process. One advantageous way of generating the keys $SK_{URT}$ and $PK_{URT}$ is to utilise a 256-bit random number RNG (256) as the secret key $SK_{URT}$ and to calculate the public key $PK_{URT}$ applying the function scalarbasemult ($SK_{URT}$). Also the notations X25519( ) or Curve25519( ) could be used.

Yet another user-specific secret may be a nonce designated simply with a letter n. The nonce n may be for example a 96-bit random number obtained from a random number generator in the user device.

If user-specific secrets of the kind described above are available, the user device may generate an encoding key $K_{USS}$ for example according to the formula $$K_{USS}=SHA2(X25519(SK_{URT},PK_{UAT}) \\ \|PK_{URT}\|PK_{UAT}\|n).$$

The use of a hashing algorithm in the process of generating the encoding key $K_{USS}$ is optional but may provide additional security against brute force computational attacks in which a malicious party could try to find out the secret key. At the time of writing this text, it has been assumed that with an optimized quantum computing approach and using the Shor's algorithm it may be possible to essentially half the number of bits in an encryption key, meaning that for example a key of 256 bits would appear as only 128 bits, on which a brute force attack may well be successful already.

The user device may then use the generated key $K_{USS}$ to encrypt the User's Secret Salt USS, for example by utilising the AES256-GCM encryption method. Using the notations introduced above, the payload of the GetUser request 1009 may be expressed as $$AES256\text{-}GCM(SHA2(X25519(SK_{URT},PK_{UAT}) \\ \|PK_{URT}\|PK_{UAT}\|n),m,n,USS).$$

Substeps 1403 and 1404 in FIG. 14 represent the user device preparing and transmitting the GetUser request 1009.

Step 1010 in FIG. 10 represents in general the actions taken by the conceptually defined registration finalization functionality comprised in the arrangement of the trust provider. An essential purpose of the registration finalization step 1010 is to ensure the application of the principle explained earlier with reference to FIG. 1. In other words, the registration finalization step 1010 ensures that the generated digital identity of the user will be based on a crypto seed and a user's secret that come from two separate environments completely independently of each other.

Due to the mathematical relationship between the key pairs (SK$_{URT}$, PK$_{URT}$) and (SK$_{UAT}$, PK$_{UAT}$), the arrangement of the trust provider may regenerate the key K$_{USS}$ as $$K_{USS}=\text{SHA2}(X25519(\text{SK}_{UAT}, \text{PK}_{URT})$$
$$\|\text{PK}_{URT}\|\text{PK}_{UAT}\|n)$$

which essentially verifies contents (K$_{USS}$) of the GetUser request 1009 against the provisional secret (PK$_{UAT}$, SK$_{UAT}$) established earlier in step 1005. The arrangement may utilise the regenerated key K$_{USS}$ to decode the User's Secret Salt USS as $$\text{Dec}(K_{USS},\text{USS})$$

These actions are comprised in substep 1501 of FIG. 15. Having associated the GetUser request 1009 with the appropriate, previously created provisional encrypted archive KUA, the arrangement may decrypt it as $$\text{Dec}(\text{SS}_{UST},\text{KUA}{\sim}(\text{UID},\text{UMD}, \dots ).$$

Using the User's Secret Salt USS, the arrangement may also perform the decoding operation $$\text{Dec}(\text{USS},\text{KUA}(P_{U0}, \dots ))$$

Now the arrangement may apply the principle shown earlier in FIG. 8 to generate first a secret key SK$_{UID}$ for the user as $$\text{SK}_{UID}=\text{Argon2Id}(P_{U0},\text{USS})$$

and then proceed to generate a corresponding public key PK$_{UID}$ as $$\text{PK}_{UID}=X25519(\text{SK}_{UID})=X25519(\text{Argon2Id}(P_{U0},$$
$$\text{USS})).$$

As already mentioned above, some computationally less intensive algorithm like the SHA2 algorithm may be used in place of the Argon2 algorithm. The generated public key PK$_{UID}$ is called the permanent user public key in substep 1502 of FIG. 15. The generated keys SK$_{UID}$ and PK$_{UID}$ are an ECC/PCI-compliant private key and an ECC/PCI-compliant public key respectively.

The generated keys SK$_{UID}$ and PK$_{UID}$ constitute the digital identity of the user in this embodiment: from the viewpoint of the trust provider, they are a cryptographic intermediate product that is deterministically dependent on both the crypto seed P$_{U0}$ and the user's secret USS that the trust provider received through a secure transport mechanism.

The generated public key PK$_{UID}$ specific to the user may also be called a finalized secret for the user. The arrangement may be further configured to generate a certificate SIGN$_{UID}$ of the user by signing the finalized secret PK$_{UID}$ with a signing key SK$_{VID}$ of the trust provider. The signing key SK$_{VID}$ of the trust provider is preferably an ECC/PKI-compliant secret key, and the signing may take place according to the Ed25519/EdDSA practices. The signing is shown as substep 1503 in FIG. 15. According to the known principle of digital signing and signature checking, anyone can check such a digital signature of the trust provider using a corresponding public key of the trust provider.

The arrangement may then proceed to using the further secret USS received in the GetUser request 1009 to encrypt and store the user identifier UID and all appropriate and available attributes UMD into a finalized encrypted archive specific to the user. The encrypting may be expressed as $$\text{Enc}(\text{USS},\text{KUA}(\text{UID},\text{UMD, SIGN}_{UID},\text{PK}_{UID},$$
$$P_{U0}, \dots ))$$

and is represented in substep 1504 in FIG. 15.

Substep 1505 in FIG. 15 represents the arrangement transmitting out a registration finalizing response, which is the GetUser response 1011 in FIG. 10. The GetUser response 1011 may convey to the user the useful end products of the registration finalization step, i.e. the updated contents of the KUA or Keystore User Archive. An encrypting key for encrypting the contents of the GetUser response 1011 may be generated as $$K_{KUA}=\text{SHA2}(X25519(\text{SK}_{UAT},\text{PK}_{URT})$$
$$\|\text{PK}_{UAT}\|\text{PK}_{URT}\|n)$$

and the encrypted payload for the GetUser response 1011 may be created according to $$\text{KUA(response)}=\text{Enc}(K_{KUA},\text{KUA}(P_{U0}, \dots )).$$

As the AES256-GCM is again an advantageous encryption method, the encrypted payload of the GetUser response 1011 may be expressed as $$\text{AES256-GCM}(\text{SHA2}(X25519(\text{SK}_{UAT},\text{PK}_{URT})$$
$$\|\text{PK}_{UAT}\|\text{PK}_{URT}\|n),m,n,\text{KUA(response)}).$$

Any or both of the encrypting operations in substeps 1504 or 1505 may be considered as an example of the trust provider's arrangement producing, through a second encryption operation, a cryptographic output including the crypto seed P$_{U0}$ in encrypted form. Transmitting the cryptographic output through the secure transport mechanism 120 (see FIG. 9) will eventually enable the user to securely reproduce the established digital identity and to utilise it in various communications and transactions. Examples of subsequent actions of the user device in step 1012 are described in the following.

Substep 1601 represents the user device receiving and at least partly decoding the GetUser response 1011. In particular, the user device may regenerate the key K$_{KUA}$ as $$K_{KUA}=\text{SHA2}(X25519(\text{SK}_{URT},\text{PK}_{UAT})$$
$$\|\text{PK}_{UAT}\|\text{PK}_{URT}\|n)$$

and subsequently use it for decoding $$\text{Dec}(K_{KUA},\text{KUA}(P_{U0}, \dots ).$$

At substep 1602 the user device may utilise the decoded information to generate its own instances of the permanent keys SK$_{UID}$ and PK$_{UID}$ that constitute the user's digital identity similarly as the trust provider's arrangement did earlier, for example $$\text{SK}_{UID}=X25519(\text{Argon2Id}(P_{U0},\text{USS}))$$

or $$\text{SK}_{UID}=X25519(\text{SHA2}(P_{U0}\|\text{USS}))$$

and $$\text{PK}_{UID}=X25519(\text{SK}_{UID})$$

If the payload of the GetUser response 1011 contained a signed form SIGN$_{UID}$ of the key PK$_{UID}$, the user device may verify its regenerated instance of PK$_{UID}$ by removing the signature of SIGN$_{UID}$ with the corresponding public key of the trust provider and checking that the result matches the regenerated instance of PK$_{UID}$. This is shown as substep 1603 in FIG. 16. Substep 1604 represents storing the signed form SIGN$_{UID}$ as the user certificate of the user.

Figure 17:
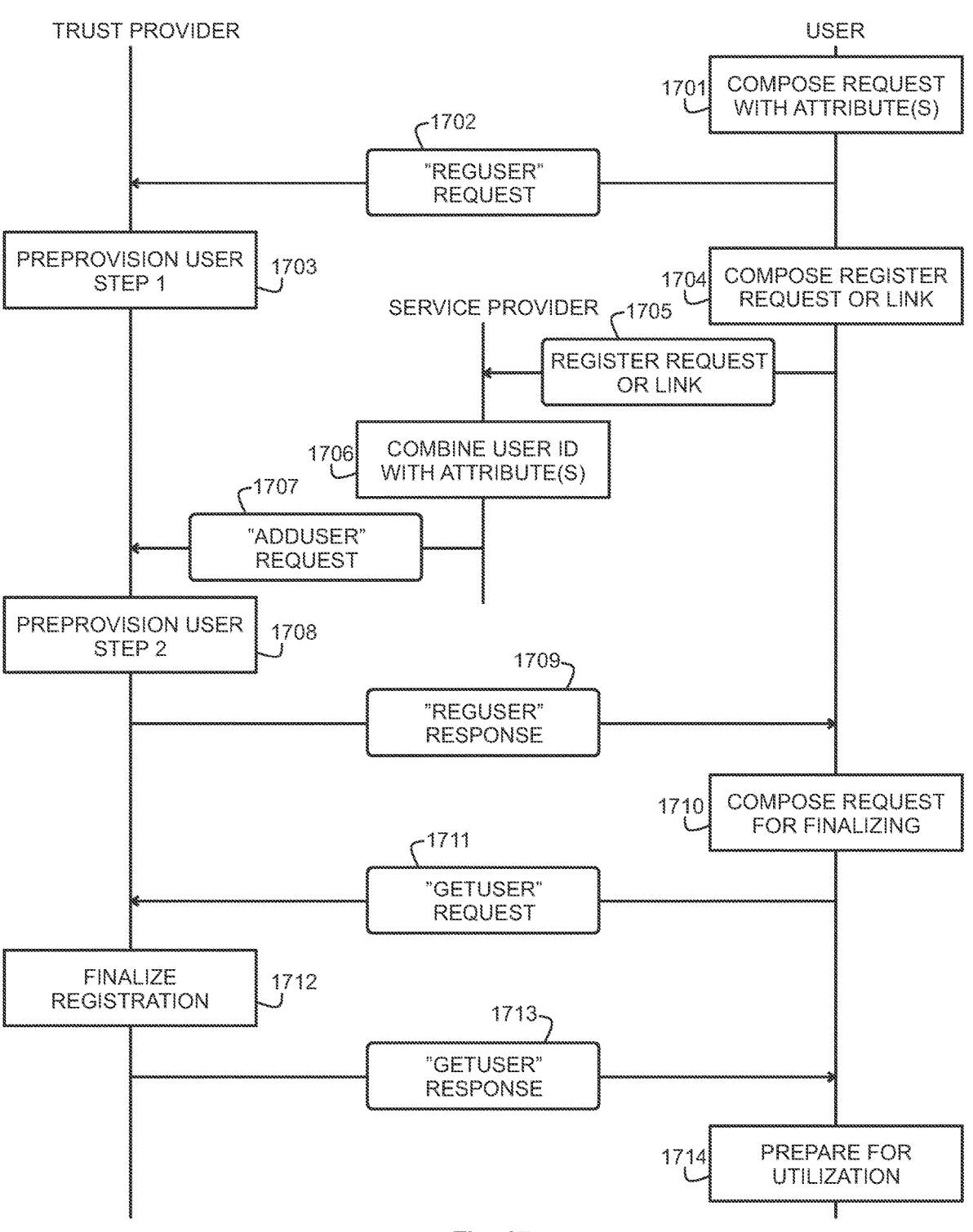
FIG. 17 illustrates actions taken and messages exchanged between a user device, a service provider, and a trust provider in an example embodiment.

FIG. 17 illustrates another example of how the principles explained above can be applied in actions taken and messages exchanged between a user, a service provider, and a trust provider in an example embodiment. The difference between the embodiments of FIGS. 10 and 17 concerns the roles of the user and the service provider in the pre-provisioning stage. At step 1701 the user device composes its version of a request message, called the RegUser request in FIG. 17. The RegUser request 1702 may convey to the trust provider for example the user's public key $PK_{URT}$, the user identifier UID, and attributes and/or other metadata UMD characteristic to the user. At step 1703, the trust provider may utilise these to set up and store a first version of a provisional encrypted archive specific to the user. The provisional encrypted archive stored at step 1703 may contain any or all information conveyed in the RegUser request, as well as a user-specific crypto seed $P_{U0}$ of high entropy generated by the trust provider's arrangement.

Steps 1704 and 1705 in FIG. 17 represent the user composing and transmitting to the service provider something that will trigger an AddUser request from the service provider to the trust provider. Said something may be for example a register request and/or a link to the appropriate user-specific information in the arrangement of the trust provider. Concerning reliable identification of the user by the service provider, steps 1704 and 1705 in FIG. 17 are quite comparable to steps 1001 and 1002 in FIG. 10 earlier.

At step 1706, the service provider may augment the information it received from the user with one or more attributes, much like in step 1003 of FIG. 10 earlier. The result of step 1706 is an AddUser request 1707 that the service provider transmits through a secure channel to the trust provider. Assuming, as also earlier in FIG. 10, that the register request 1705 brought the public key $PK_{URT}$ to the attention of the service provider, the AddUser may further convey the same $PK_{URT}$ to the trust provider. A user identifier such as UID may be included in the AddUser request 1707 but is not necessary, because if the trust provider received the key $PK_{URT}$ already in the RegUser request 1702, it can be used to identify the user just as easily and reliably.

Step 1708 in FIG. 17 represents a second round of pre-provisioning at the trust provider's arrangement. This second round is essentially similar to what was explained about repeating the pre-provisioning steps earlier with respect to FIG. 10: the additional information that originated from the service provider at step 1706 is added to the provisional encoded archive specific to the user at the trust provider's arrangement. Such additional information may additionally or alternatively have originated from the user at step 1704. However, as the trust provider does not yet possess the user's secret 113 of FIG. 1, it cannot finalize the registration of the user yet.

In the embodiment of FIG. 17, the trust provider sends the RegUser response 1709 directly to the user, without routing it via the service provider. As an alternative, it could go through the service provider much like in steps 1006 and 1007 of FIG. 10. The RegUser response 1709 conveys to the user the ephemeral public key $PK_{UAT}$, which the user device then utilises at step 1710 to compose the GetUser request 1711. Again, these two steps may be similar to the corresponding steps 1008 and 1009 of FIG. 10. Through the GetUser request 1711 the trust provider acquires the user's secret that it needs for generating the digital identity of the user and also otherwise finalize the registration of the user at step 1712. The GetUser response 1713 and its utilisation by the user device at step 1714 may be similar to the corresponding steps 1011 and 1012 in FIG. 10.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An arrangement for establishing a digital identity for a party, the arrangement comprising:
   a random data generator configured to produce a crypto seed $(P_{U0})$,
   a receiving end and a transmitting end of a secure transport mechanism for communicating with external sources,
   a first cryptographic operation coupled to said random data generator and said receiving end of the secure transport mechanism, and
   a second cryptographic operation coupled to said first cryptographic operation and said transmitting end of the secure transport mechanism;
   wherein said arrangement is configured to produce, through said first cryptographic operation, a cryptographic intermediate product that is deterministically dependent on both said crypto seed $(P_{U0})$ and a user's secret (USS) received from an external source through said secure transport mechanism, which cryptographic intermediate product constitutes said digital identity of said party, and wherein said arrangement is configured to produce, through said second cryptographic operation and using said digital identity of said party, a cryptographic output including said crypto seed ($P_{U0}$) in encrypted form, and wherein said arrangement is configured to transmit at least part of said cryptographic output through said secure transport mechanism; and wherein the arrangement is configured to permanently obfuscate said digital identity from memory after using it in said production of said cryptographic output.

2. The arrangement according to claim 1, wherein:

the arrangement is configured to produce, through said second cryptographic operation, a cryptographic certificate of said party as a part of said cryptographic output.

3. The arrangement according to claim 1, comprising:

a pre-provisioning functionality configured to respond to a received pre-provisioning request, indicative of an identifier (UID) and at least one attribute (UMD) of said party, by establishing a provisional secret ($PK_{UAT}$, $SK_{UAT}$) for said party and transmitting out a pre-provisioning response containing at least a part ($PK_{UAT}$) of said provisional secret, a registration finalizing functionality configured to respond to a registration finalizing request, received after said transmitting of the pre-provisioning response, by verifying contents ($K_{USS}$) of said registration finalizing request against said provisional secret ($PK_{UAT}$, $SK_{UAT}$);

wherein said pre-provisioning functionality is configured to use said crypto seed to encrypt and store said identifier (UID) and said at least one attribute (UMD) into a provisional encrypted archive specific to said party, and wherein said registration finalizing functionality is configured to use said user's secret (USS) received in said registration finalizing request to encrypt and store said identifier (UID) and said at least one attribute (UMD) into a finalized encrypted archive specific to said party, and wherein the arrangement is configured to use said digital identity in said encrypting and storing of said identifier (UID) and said at least one attribute (UMD) into said finalized encrypted archive.

4. The arrangement according to claim 3, wherein said pre-provisioning functionality is configured to:

generate a pair of ephemeral keys of an asymmetric encryption system as said provisional secret ($PK_{UAT}$, $SK_{UAT}$) for said party, and transmit a public key ($PK_{UAT}$) of said pair of ephemeral keys in said pre-provisioning response.

5. The arrangement according to claim 4, wherein said pre-provisioning functionality is configured to:

use a random number provided by said random data generator as the secret key ($SK_{UAT}$) of said pair of ephemeral keys, and generate the public key ($PK_{UAT}$) of said pair of ephemeral keys from said secret key ($SK_{UAT}$) of said pair of ephemeral keys using the Curve25519 Elliptic Curve Diffie-Hellman method.

6. The arrangement according to claim 4, wherein said pre-provisioning functionality is configured to:

generate a first shared secret ($SS_{UST}$) through a first mathematical operation using said secret key ($SK_{UAT}$) of said pair of ephemeral keys and a public key ($PK_{URT}$) received from an entity external to said arrangement, and use said first shared secret ($SS_{UST}$) in said encrypting and storing of said identifier (UID) and said at least one attribute (UMD) into said provisional encrypted archive.

7. The arrangement according to claim 1, wherein:

the arrangement is configured to use an Argon2 hash operation as said first cryptographic operation.

8. The arrangement according to claim 1, wherein:

the arrangement is configured to use said digital identity to generate parts of the cryptographic output ($PK_{UID}$) for said party and the arrangement is configured to generate a certificate of said party by signing at least part of the cryptographic output ($PK_{UID}$) with a signing key ($PK_{VID}$) of the arrangement.

9. The arrangement according to claim 8, wherein:

the arrangement is configured to generate, as one of said parts of the cryptographic output, a public key of a further pair of keys of an asymmetric encryption system from said digital identity, using the Curve25519 Elliptic Curve Diffie-Hellman method.

10. The arrangement according to claim 1, wherein:

the arrangement is configured to transmit said cryptographic output in a registration finalizing response after said generating of said digital identity.

11. The arrangement according to claim 10, wherein:

the arrangement is configured to transmit, in said registration finalizing response, said crypto seed ($P_{U0}$) in encrypted form as well as a signed form of an encryption key for use by an entity external to said arrangement, wherein said encryption key is one half of a key pair of an asymmetric encryption system constituting or derived from said digital identity (105) of said party.

12. A method for establishing a digital identity for a party, the method comprising:

producing a crypto seed ($P_{U0}$) as a piece of random data, receiving a user's secret (USS) from an external source (110) through a secure transport mechanism (120), applying a first cryptographic operation to produce a cryptographic intermediate product that is deterministically dependent on both said crypto seed ($P_{U0}$) and said user's secret (USS), which cryptographic intermediate product constitutes said digital identity of said party, applying a second cryptographic operation to said digital identity of said party to produce a cryptographic output including said crypto seed ($P_{U0}$) in encrypted form, transmitting at least part of said cryptographic output through said secure transport mechanism to said external source; and permanently obfuscating said digital identity from memory after using it in said production of said cryptographic output.

13. The method according to claim 12, comprising:

producing, through said second cryptographic operation, a cryptographic certificate of said party as a part of said cryptographic output.

14. The method according to claim 12, comprising:

responding to a received pre-provisioning request, indicative of an identifier (UID) and at least one attribute (UMD) of said party, by establishing a provisional secret ($PK_{UAT}$, $SK_{UAT}$) for said party and transmitting out a pre-provisioning response containing at least a part ($PK_{UAT}$) of said provisional secret, as a part of said establishing of the provisional secret ($PK_{UAT}$, $SK_{UAT}$), using said crypto seed to encrypt and store said identifier (UID) and said at least one attribute (UMD) into a provisional encrypted archive specific to said party, responding to a registration finalizing request, received after said transmitting of the pre-provisioning response, by verifying contents ($K_{USS}$) of said registration finalizing request against said provisional secret ($PK_{UAT}$, $SK_{UAT}$), using said user's secret (USS) received in said registration finalizing request to encrypt and store said identifier (UID) and said at least one attribute (UMD) into a finalized encrypted archive specific to said party, and using said digital identity in said encrypting and storing of said identifier (UID) and said at least one attribute (UMD) into said finalized encrypted archive.

\* \* \* \* \*